United States Patent
Hinterberger et al.

(10) Patent No.: US 12,087,970 B2
(45) Date of Patent: Sep. 10, 2024

(54) BATTERY WITH A BATTERY MODULE AND METHOD FOR ITS OPERATION

(71) Applicant: AUDI AG, Ingolstadt (DE)

(72) Inventors: Michael Hinterberger, Großmehring (DE); Christoph Terbrack, Ingolstadt (DE); Christian Endisch, Geisenfeld (DE); Julia Stöttner, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 676 days.

(21) Appl. No.: 17/097,403

(22) Filed: Nov. 13, 2020

(65) Prior Publication Data

US 2021/0151726 A1 May 20, 2021

(30) Foreign Application Priority Data

Nov. 14, 2019 (DE) ...................... 10 2019 130 738.4

(51) Int. Cl.
*H01M 50/502* (2021.01)
*H01M 10/12* (2006.01)
*H01M 10/42* (2006.01)
*H01M 50/543* (2021.01)

(52) U.S. Cl.
CPC ....... *H01M 50/502* (2021.01); *H01M 10/122* (2013.01); *H01M 10/425* (2013.01); *H01M 50/543* (2021.01); *H01M 2010/4271* (2013.01); *H01M 2220/20* (2013.01)

(58) Field of Classification Search
CPC ............. H01M 50/502; H01M 50/543; H01M 10/122; H01M 10/425; H01M 2010/4271; H01M 2220/20
See application file for complete search history.

(56) References Cited

U.S. PATENT DOCUMENTS

| 2008/0054327 A1* | 3/2008 | Johnson ............ H01M 10/4207 257/301 |
| 2014/0049230 A1 | 2/2014 | Weyh |

(Continued)

FOREIGN PATENT DOCUMENTS

| DE | 10 2010 041 049 A1 | 3/2012 |
| DE | 10 2010 041 059 A1 | 3/2012 |
| DE | 10 2016 224 002 A1 | 6/2018 |

(Continued)

OTHER PUBLICATIONS

Examination Report issued on Oct. 14, 2020 in corresponding German application No. 10 2019 130 738.4; 14 pages including Machine-generated English-language translation.

(Continued)

*Primary Examiner* — Alexander Usyatinsky
(74) *Attorney, Agent, or Firm* — Maier & Maier, PLLC

(57) ABSTRACT

A battery cell having first cell connectors, a galvanic cell and a first switching unit electrically coupled to the first cell connectors and the galvanic cell for electrically coupling the galvanic cell to the first cell connectors depending on a switching state of the first switching unit. The battery cell has second cell connectors electrically separated from the first cell connectors and a second switching unit electrically coupled to the second cell connectors and the galvanic cell for electrically coupling the galvanic cell to the second cell connectors depending on a switching state of the second switching unit.

15 Claims, 14 Drawing Sheets

(56) References Cited

U.S. PATENT DOCUMENTS

2015/0042283 A1* 2/2015 Camp ............... H02J 7/007194
                                                    320/121
2019/0288526 A1* 9/2019 Jaensch ............... H01M 10/425

FOREIGN PATENT DOCUMENTS

DE    10 2018 106 306 A1    9/2019
DE    10 2018 109 926 B4    12/2019
WO    WO-2018099731 A1 *    6/2018    .............. B60L 50/64

OTHER PUBLICATIONS

Office Action issued on Mar. 21, 2024, in corresponding Chinese Application No. 202011278063.5, 15 pages.

* cited by examiner

BATTERY WITH A BATTERY MODULE AND METHOD FOR ITS OPERATION

FIELD

The invention concerns a battery cell with first cell terminals, a galvanic cell, a first switch unit electrically connected with the first cell terminals and the galvanic cell for electric connection of the galvanic cell with the first cell terminals depending from the switching state of the first switch unit. Furthermore, the invention concerns a battery module with at least two battery cells, a battery with at least one battery module, as well as a motor vehicle with an electrical system, which covers an electric machine as a driving mechanism and a battery.

The invention also covers a battery with a number of battery modules arranged next to each other and comprising at least two module connections and a number of semiconductor switch elements, wherein each battery module covers at least one battery cell. Furthermore, the invention concerns a battery module with at least one battery cell. Furthermore, the invention concerns a method to produce a number of preset electric voltages by means of a battery, wherein the battery comprises a number of battery modules arranged next to each other and comprising at least two module connections and a number of semiconductor switch elements, wherein each battery module covers at least one battery cell, whereby the preset electric voltages are produced at the terminal poles of the battery.

BACKGROUND

Batteries, battery modules with battery cells, method for their operation and motor vehicles of the generic type are well-known from the state-of-the-art. Batteries of the generic type have stationary applications, such as in interruption-free energy sources, electric energy sources with isolated operation and/or the like, but they are also used in motor vehicles, especially in electrically driven ones, such as electric cars, hybrid cars and the like.

Batteries of the generic type normally serves reversible storage of electric energy. Such a battery is also called accumulator. For reversible storage of energy, the battery normally comprises multiple battery cells, which contain a galvanic cell, which can save electric energy chemically. To this end, the galvanic cell normally comprises two electrodes, which serve as the respective potential connections of the galvanic cell. The electrodes are chemically connected, for example, via an electrolyte that interacts with the electrodes. Direct current then appears at the electrodes, mostly for electrochemical reasons. The direct current appearing between electrodes of a single galvanic cell is normally in the order of several volts, depending upon the cell chemistry, such as about 1.2 V to 4.5 V.

Batteries of the generic type must often produce strong direct current, for example, direct current in multiples of 100 V in electrically driven motor vehicles, preferably about 400 V or more, especially about 800 V. Therefore, for a battery to produce such direct current, a number of battery cells must be electrically connected in series. Depending upon energy or performance needs, it may also be necessary to connect battery cells in parallel.

This produces special requirements, especial those related to structure and electric safety, which must be observed for such batteries that are also called high-voltage batteries. Dues to such requirements, it has become common practice to design batteries in a modular way. To this end, it is common practice to connect a number of galvanic cells, mechanically and electrically, into one battery module, so that there is a single unit, which may be treated as a whole. A battery module can be tested as a separate design unit in terms of its qualities, especially with respect to its electric qualities. The battery is then constructed from the respective number of such battery modules, for example, by connecting the battery modules as prescribed, mechanically and/or electrically, preferably into a single unit, for example, by bringing them together into the battery case as necessary. Battery modules can also have their own cases in which battery cells are arranged. The cases can also consist of merely a frame, which keeps in place the respective battery modules with respect to the battery, or keeps in place the respect battery cells with respect to the battery modules.

To this end, a battery module normally comprises two module connections, that are connected to the battery cells electrically on the battery module side. The module connections, in their turn, are electrically connected with the terminal poles of the battery inside the battery, so that the required direct current can be produced at the terminal poles of the battery. Therefore, direct current at the terminal poles of the battery is typically stronger than direct current at the module connection terminals, which in its turn is stronger than the direct current produced at the battery cells or their respective electrodes of the respective single galvanic cells. If there is a purely parallel connection of battery cells within a battery module or battery modules withing the battery, then the respective direct currents are equal.

A sample battery module design provides for twelve battery cells arranged in a mechanical case and connected with one another electrically by power rails in series and/or connected in parallel. The battery cells should preferably be arranged so as to be electrically isolated. They can also be cooled by a cooling device. Such battery modules are fit to be used as standardized units, so that nearly any battery can be constructed by placing the respective number of battery modules together in the battery. Such structure is disclosed, for example, in DE 10 2016 224 002 A1.

It is particularly typical in the state-of-the-art for electrically driven motor vehicles to connect the battery via an energy converter, often represented by an inverter or a direct current converter, with an electric machine as a driving mechanism. This turns out to be quite complicated. It must also be considered that it is typically two or three level inverters that are used in this case. As a result, the issue of electromagnetic compatibility becomes highly relevant in case of energy conversion, and also harmonic content of alternating current produced by the inverter can be high. The same considerations also apply in principle to direct current converter.

DE 10 2010 041 059 A1 shows a method for setting up a required output voltage of an energy supply branch of a controllable energy store. This method provides for an energy store, which comprises multiple energy storage modules connected in series, which in their turn comprise multiple energy storage cells connected in series. Each energy storage module comprises two switch elements, whereby energy storage cells are connected in series with a switch element, and such series connection is switched parallel to the second switch element. The respective energy storage module can thus be activated or deactivated by the respective switching of the switch element. The appropriate switching of the switch elements should enable production of alternating current at the respective end of such series connection, namely the Multi Level Converter type, which is also called MMC, M2C, MMI, M2I or the like. This should make the inverter unnecessary according to the method of DE 10 2010 041 059 A1.

Multi Level Converter, as well as the method of its operation, is well-known from the state-of-the-art as well, so that no specific literature reference should be necessary. This also applies to converter modules of such a Multi Level Converter used to create the Multi Level Converter. Multi Level Converters are a special design type of clocked energy converters. Such Multi Level Converters are preferably used bi-directionally, so that both electric energy from an alternating current side to a direct current side and that from the opposite direction can be converted. Conversion is typically performed without significant change of the voltage level, which means that the level of a maximum amplitude of the alternating current essentially corresponds to a half of an direct current of the intermediate circuit to which the Multi Level Converter is connected. This fact is detrimental to the MMC topology known from the state-of-the-art, since producing voltage of different polarities (both positive and negative) requires a separated number of cells, which means that to create, for example, a sine-formed output voltage with a pre-set number of battery cells, one half is required for the positive sine halfwave and the other half is required for the negative sine halfwave. This can only produce output voltages with an amplitude value equal half of the maximum battery output voltage.

Multi Level Converter normally comprises a series connection of multiple converter modules, which in their turn contain a converter module condenser, as well as a parallelly connected series connection of two semiconductor switches connected in series. Due to their connection structure, control of converter module is relatively safe in operation compare to alternative connection concepts, especially with respect to a two level inverter, which is why a Multi Level Converter is particularly well fit for applications at high voltages. In addition to that, Multi Level Converter does not require an intermediate circuit condenser on the intermediate circuit side, which otherwise becomes very complicated and expensive with high voltage. Basically, instead of the converter module condenser or in addition to it, a battery cell, battery module, or even a battery can be provided.

Wiring options known for Multi Level Converters range from the so-called Flying-Capacitor-, Neutral-Point-clamped (NPC)-Multi Level Converter up to Cascaded H-Bridge (CHB)-Multi Level Converter. The most important feature of the latter is its scalability, because it enables output voltage to be generated by consecutive connection of separate modules. The modules or converter modules mostly comprise an H-bridge circuit of semiconductor switches and a converter module condenser. Alternatively, a converter module condenser can be accompanied by a battery or a battery module. Depending upon the circuit structure, any number of phases and thus any n-phase alternating current can be generated.

In addition to the CHB option, there is also an option to cascade half bridge modules, which comprise mere two semiconductor switches connected in series and the associated converter module condenser. Although this can reduce the number of semiconductor switches, for example, by about a half, which would result in reduction of poser loss in the intended operations, but this circuit structure is detrimental, because only one unipolarity can be achieved with respect to alternating current. This problem also underlies the method of DE 10 2010 041 059 A1.

SUMMARY

The goal of the invention is to further develop a battery of the generic type, a battery module, a method for production of a pre-set voltage by a battery, and a motor vehicle, so that the battery can be used for immediate power supply to the energy supply network, especially an electric machine subject to alternating current, while reducing the costs compared to the state-of-the-art.

As a solution, the invention offers a battery, a battery module, a method for production of a pre-set voltage by a battery, and a motor vehicle.

With respect to a generic battery cell, it is, in particular, suggested that the battery cell of the first cell terminals comprise electrically separate second cell terminals, as well a second switching unit electrically connected to the second cell terminals and the galvanic cell for electric connection of the galvanic cell with the second cell terminals depending upon the switching state of the second switching unit.

With respect to a generic battery module, it is, in particular, suggested that the battery cells be designed according to the invention and that exactly two of the first cell terminals of one of the battery cells be electrically connected to exactly two of the first cell terminals of the second of the battery cells.

With respect to a generic battery, it is, in particular, suggested that the battery module be designed according to the invention and that the battery have at least six terminal poles to which at least one battery module is connected.

With respect to the generic method it is, in particular, suggested that the second cell terminals electrically separated from the first cell terminals of the battery cell be electrically connected by means of a second switching unit connected with the second cell terminals and the galvanic cell depending upon the switching state of the second switching unit.

With respect to the generic motor vehicle, it is, in particular, suggested that the battery be designed according to the invention and the electric machine be directly connected to the battery.

With respect to a generic battery, it is, in particular, further suggested that the battery modules have four module connections each, namely the first, the second, the third, and the fourth module connection, wherein the battery has, in order to produce multiple independent voltages, the number of terminal poles of the battery corresponding to the number of voltages, electrically connected to the respective terminal pole cables of the battery, wherein the battery comprises at least for one part of the battery module a circuit structure, in which at least one of the module connections of at least two different battery modules is electrically connectable via the respective connection elements depending on their switching states with the respective of the multiple terminal pole cables.

With respect to a generic battery module, it is, in particular, further suggested that the battery module have four module connections for electric connection of module connections of further battery modules and/or terminal poles of a battery comprising the battery module.

With respect to a generic method, it is, in particular, further suggested that the battery modules have at least four module connections each, namely the first, the second, the third, and the fourth module connection, wherein the battery has, in order to produce multiple independent voltages, the number of terminal poles of the battery corresponding to the number of voltages, electrically connected to the respective terminal pole cables of the battery, wherein the battery comprises at least for one part of the battery module a circuit structure, in which at least one of the module connections of at least two different battery modules is electrically connectable via the respective connection elements depending on their switching states with the respective of the multiple terminal pole cables, whereby semiconductor switch elements and connection switch elements of the battery are activated depending upon the voltages given for the battery, in order to produce the pre-set voltages on the terminal poles of the battery.

The invention is based, among other things, on the idea that, if the battery is supposed to be operated as a Multi Level Converter, although paralleling of phase lines can increase the number of output voltages, a better degree of freedom can be achieved within one line for step-shaped simulation of the respective phase voltage, especially if the phase voltage is alternating current. Single battery cells or battery modules can indeed by "bridged" in the state-of-the-art, but the invention makes it possible to use the "bridged" battery cells or battery modules, at least during the bridging, in a different manner, for example, attribute them to a different phase. Contrary to the state-of-the-art, it can thus be achieved that the battery can be better used up in total. This applies obviously not only at the battery cell level, but also at the battery module level. Therefore, the invention makes it possible, among other things, to use battery modules or battery cells in virtually any way for the respective voltage path or line, and to adjust or change this use almost in any way. For example, to produce a three-phase alternating current, the battery modules or battery cells currently not used by the battery can be put to a different use, for example, to produce direct current, for example, to enable work of a separately excited synchronous machine or the like. In this process, the respective attribution of battery modules or battery cells to voltage paths or lines can vary in time.

It can be achieved by the first and second cell terminals of a respective battery cell in conjunction with the first and second switch unit of the battery cell that the galvanic cell of the battery cell can be used in nearly any way for voltage production. The first cell terminals can also be assigned as main terminals and/or the second cell terminals as additional terminals. The first and second cell terminals make it possible to use the battery cell for production of two different voltages, which can be, for example, either direct currents or alternating currents. These voltages can be produced simultaneously by a battery with the battery cells or battery modules according to the invention.

Via the first and second switch unit, the voltages can be separated from each other, so that preferably galvanic separation between the voltages can also be implemented, although the battery cell or its galvanic cell can be activated or deactivated for provision of the respective required voltage in the respective switching state of the first and second switch unit. To this end, the battery cell comprises the first and second cell terminals, which can be attributed to one of the required electric voltages, for example, by connecting them in the respective way. Thus, the invention makes it possible to use the battery cell, and especially its galvanic cell, in a highly flexible manner for provision of voltage if the battery cell is arranged in a respective battery module or battery.

With the specific circuit structure it is possible not only to activate the battery cell as necessary for provision of the required electric voltage, but also to bridge the battery cell or its galvanic cell as necessary for provision of one of the required voltages. Therefore, the invented battery cell opens a new, highly flexible application opportunity to provide voltages. In particular, the invention makes it possible not only to directly produce alternating currents by using the battery or battery module, but also to use the battery cells of the respective battery module or battery as necessary in a highly flexible manner to produce the respective voltage. For example, it is possible, depending upon the required voltage amplitudes, to activate or deactivate the battery cells or their galvanic cells differently at different times for the respective required voltage. Furthermore, an unused battery cell or its galvanic cell can be attributed in a highly flexible manner.

Moreover, the invention makes it possible to design the load of the battery cells or galvanic cells in such way that even load of the battery cells can be achieved in a pre-set time interval. This is beneficial for the use of the battery or battery module, because the load and thus the aging of the battery cells can be made even.

The first and second switch units should preferably comprise at least one respective switch element each, which element can also be designed as a semiconductor switch element. Obviously, it can also be provided that that the switch units are designed not only to bridge the galvanic cell of one respective battery cell with respect to the first and/or second cell terminals, but also to switch, if necessary, polarity of the galvanic cell, so that the desired effect can be achieved. For example, it can be provided that the first switch unit is designed to electrically connect couples of two of the attributed first cell terminals with each other. This provides a simple way to connect in parallel galvanic cells of the battery cells, which are connected in series or cascaded with respect to the first cell terminals. Obviously, it can also be provided that the galvanic cells as such are connected in series with a respective switch element, so that, depending upon the required function state, it can be activated or deactivated within the battery cell.

Furthermore, the first switch unit can also be designed to be able to implement potential change with respect to the first cell terminals, for example, by making the potentials of two of the first cell terminals switchable or the like with the potentials of two other of the first cell terminals.

The invention, in which furthermore the respective battery module can be connected via semiconductor switch elements with more than only two of adjacent battery modules, makes it possible to achieve an extended functionality with respect to the cascading or simple series connection of battery cells or battery modules typical in the state-of-the-art. Therefore, the invention makes it possible to electrically combine single battery modules with one another in virtually any way, or separate them galvanically, so as to implement a kind of matrix connection of the battery cells or battery modules. This way it can be achieved that battery cells or battery modules unused at certain times, for example, within the respective phase, can be concurrently used for voltage production of another phase of a multi-phase alternating current or for provision of a direct current. This is particularly beneficial for wiring system of a motor vehicle.

The specific circuit structure of the battery, in particular in conjunction with that of the battery modules or battery cells, thus allows to achieve multifunctionality of the battery, which enables provisions of virtually any voltages in a highly flexible way. This makes the invented battery particularly well fit to directly provide one or even multiple alternating currents and/or direct currents, for example, for operation of electric alternating current machines or the like. The invention is not limited to provision of electric power, for example, in order to operate an electric machine for engine operation, but is equally fit to receive electric power and distribute it respectively into single battery modules and/or battery cells, for example, when an electric machine is operated in a generator.

It is thus an aspect of the invention that those battery cells, which in the state-of-the-art are attributed to generation of single phase voltages, but do not have to be activated due to the voltage production at that moment, can be used for production of other phase voltages or direct currents. This way the battery can be utilized in a much better way. The invention provides a degree of freedom with respect to the flexibility of attribution of battery cells or battery modules. Attribution can be changed in a highly flexible way by means of semiconductor switch elements. If, for example, provision of a three-phase alternating current network by the battery is required, this can be achieved with the number of an battery cells or battery modules smaller than that in the state-of-the-art, while retaining essentially the same electric data.

The invention is thus not limited to electrically connecting the respective battery module with merely two adjacent modules, as might be necessary, but further electric connections can be provided for. In particular, the invention not only makes it possible to achieve a two-dimensional matrix attribution of the battery module in this manner, but it also enables three-dimensional attribution that allows to add the battery modules into the respective voltage or provision lines in various ways. This can further increase the degree of freedom with respect to combination options of battery modules within the battery for voltage provision. The battery modules can be combined with each other as needed to produce the pre-set voltage, for example, a phase of a multi-phase alternating current, by activation or deactivation. If necessary, the respective battery module can be fully disconnected from the circuit structure. This increases flexibility of provision of required pre-set voltages.

In addition to provision of alternating currents, the invention further allows, preferably concurrently, to produce one or more direct currents, for example, to provide with electric power a low-voltage wiring system of a motor vehicle or the like. The circuit structure used in the invention allows to provide battery modules, preferably galvanically separated, for this purpose. It can also be provided that the modules provided for direct current need not be the same at all times. It can be provided the modules used for direct current can vary in time, for example, depending upon the alternating currents or the like provided by the battery. It can also be provided that the battery modules used for provision of direct current can vary to implement balancing/even load at least partially.

Therefore, the invention makes it possible to provide pre-set voltages in a highly flexible manner, for example, alternating currents with virtually any number of phases. An alternating current can in this case have virtually any curve, for example, in the shape of sine, triangle, saw tooth and/or the like. Phase shifts of a multi-phase alternating current and amplitudes and frequencies can also be adjusted as need in virtually any way.

In addition to activation and deactivation of specific battery modules, it can also be achieved by means of semiconductor switch elements that one of the battery modules can be bridged, for example, by closing between the battery modules the semiconductor switch elements, which electrically connect the required battery modules in optimal shape, so that the unnecessary battery modules are removed from the respective current path. This can reduce the lengths of load paths or current paths, as well as the number of semiconductor switch elements affected by electric current, which reduces the overall battery loss. This can be especially useful to fully isolate in a galvanic way a defective battery module by holding all semiconductor switch elements directly connected to this battery module in disconnected state.

The circuit structure of the battery used in the invention also makes it possible to use battery modules or even battery cells that are different from each other. In other words, it is not required that battery modules or battery cells have identical design.

The module matrix or matrix arrangement, which can be achieved with the circuit structure of the battery or battery module used in the invention, makes it possible not only to parallelize single battery module lines for provision of various phase voltages or the like, but also to connect all battery cells or battery modules in series, which results in particularly extensive range for production of pre-set voltages, especially in connection with the respective battery module. Furthermore, a high maximum value of the voltage provided by the respective battery module can also be set up depending upon the operating behavior. An optional parallel connection of battery modules and/or battery cells can also be used to adjust to the respective electric current requirement.

The total expense for the battery can be reduced below that existing in the state-of-the-art, especially when it serves production of a multi-phase alternating current, whose phases are shifted together, which can reduce the space taken up by the battery. However, it can take into account that a certain number of reserve modules or reserve battery cells can be provided, for example, for example, to serve as a reserve in case of disruption or similar operating behavior.

The switching topology of the respective battery module can also be used to enable a higher potential or freedom with respect to the required pre-set voltage of a Multi Level Converter type. The switching topology of the battery module does not have to be the same for all battery modules, though. It can also vary. This can be taken into account in the respective control of the battery.

The switch element or semiconductor switch element can be represented by a transistor, especially a field-effect transistor, preferably a metal oxide Field-Effect Transistor (MOSFET), an Insulated-Gate Bipolar Transistor (IGBT), or Gate-Turn-Off-Thyristor (GTO) and/or the like. These semiconductor switch elements are preferably arranged in an integrated way in the battery, battery modules and/or their battery cells.

For the battery to provide the required voltage production functionality, the semiconductor switch elements are operated in switched mode. With respect to a semiconductor switch element using a transistor, switched mode means that a very small electric resistance is created in the switched on state between the connections creating a switching path of the transistor, so that a high electric current is possible with very low residual voltage. In a switched off state, to the contrary, the switching path of the transistor is high-resistance, which means that it creates high resistance, so that even with high voltage on the switching path there is essentially no or a very small, often negligible, current. Linear mode of transistors is different.

The battery can include a control unit. The control unit is connected at least to the semiconductor switch elements of the battery. It can preferably, additionally or alternatively, also be connected to the switch elements, especially bridging switch elements of the battery cells and/or battery modules. To this end the semiconductor switch element can have a respective communication interface via which it communicates with the control unit. The communication interfaces can, for example, be connected by wiring and/or be cordless. A cordless communication connection can be based, for example, on radio connection, in particular near field communication. Preferably, each of the semiconductor switch elements is in direct communication with the control unit. This way the control unit can control activation or deactivation of the respective battery module, as well polarity of their respective battery cells.

The control unit as such can represent a separate design unit. However, it is preferably integral part of the battery and it is particularly preferred that it be integrated into it.

A battery module according to the invention comprises, for example, at least four module connections, namely the first, second, third, and fourth module connections. Preferably, each of the module connections of the battery module is electrically connectable with a respective module connection of a further battery module, which preferable adjacent in space, via a respective semiconductor switch element, depending on its switching state. However, it can also be provided that the respective module connection can be electrically connected with more than one further module connection of a further battery module, with the respective semiconductor switch element being provided for the respective electric connection. This design is particularly good for implementation of a three-dimensional matrix arrangement, resulting in a further improvement in flexibility of use of battery modules within the battery.

Contrary to the state-of-the-art, the invention does not require a bridging option on the battery module side for the respective battery module, as it is, for example, required by the method of DE 10 2010 041 049 A1.

If the respective battery module only comprises one battery cell, it can be preferably provided that the first and second module connections, as well as the third and fourth module connections are connected in parallel, respectively, to a respective battery cell terminal.

The battery can at least partially comprise the circuit structure used in the invention. In addition to battery modules connected according to the invention, there can also be additional battery modules, which are electrically connected in a different way. It is particularly beneficial if the circuit structure according to the invention is used for as many battery modules as possible. In particular, the respective deviation can be provided for in border areas of the matrix structure or battery, for example, because not enough adjacent battery modules are available to implement the complete circuit structure according to the invention.

Preferably, the battery cell comprises at least two first cell terminals and at least two second cell terminals. It is particularly preferred that the battery cell comprise at least four first cell terminals. This design is particularly well fit for use of a battery cell in a battery, which should be able to produce not only alternating current, but also concurrently a further one-phase alternating current or a direct current. It can be achieved via the four first cell terminals with respect to the battery cell functionality that it provides withing a series connection or cascade connection of multiple battery cells in a highly flexible manner both positive and negative contribution to voltage production. It can also be achieved with the invented battery that series connection or cascading of multiple battery cells is simplified, because polarity switch of galvanic cells can be at least partially compensated for by the respective switch of the switch units.

With at least two second cell terminals it is further possible to attribute the battery cell or its galvanic cell to provision of a further voltage, which can be, for example, an alternating current or a direct current. At the same time, this design allows to galvanically separate the voltages that are to be provided.

It is further suggested that the first switch unit and/or the second switch unit comprise at least one bridge switch element. With the bridge switch element it is possible to bridge the battery cell with respect to the first or second cell terminals or the galvanic cell, so that the galvanic cell or the battery cell need not be activated to provide voltage. This is a simple way to create flexibility for voltage provision.

It is further suggested that the first switch unit is designed, depending on one of the many switching states of the first switch unit, to electrically connect at least two of the first cell terminals, and/or the second switch unit is designed to electrically connect at least two of the second cell terminals. This is a simple way to achieve the bridging functionality of the battery cell for each of the required voltages. With respect to the first switch unit, the respective switch bridge unit can be provided to electrically connect the respective first cell terminals with each other. With respect to the second switch unit, it can be provided that it comprises three switch elements connected in series, wherein the series connection is connected, in particular, directly, to the galvanic cell of the battery cell, the center taps provided in this way are connected to the respective second cell terminals. With this circuit structure, the required functionality can be implemented with low costs.

It is further suggested that the battery cell comprises four first cell terminals as main connections and two second cell terminals as additional connections, wherein the first switch unit comprises one first switch element for electric connection of the second and third main connection, one second switch element for electric connection of the first and fourth main connection, one third switch element for connection of the first and second main connection, and a fourth switch element connected to the galvanic cell in series, whereby this first series connection between the second fourth main connections is connected in such way that one of the potential connections of the galvanic cell is connected to the fourth main connection, and whereby the second switch unit comprises a series connection of three switch elements, whereby this second series connection is directly connected to the potential connections of the galvanic cell, and the respective center tap of the series connection is connected to the respective of the two additional connections. This way it can be achieved that the main connections are used to produce the first voltage and the additional connection to produce the second voltage. With respect to the main connections, even polarity of the galvanic cell can be adjusted as needed. This design shows how the first and second switch unit can be designed to implement the required functionality.

With respect to a battery module, it is further suggested that exactly one of the second cell terminals of the first of the battery cells is electrically connected to exactly one of the second cell terminals of the second of the battery cells. This way the second cell terminals can be used for individual provision of voltage via the battery module.

According to a further embodiment, it is suggested that the battery comprise for at least a part of the battery modules a circuit structure, in which a first module connection of a first of the battery modules is electrically connectable via a first of the semiconductor switch elements with a fourth module connection of a second of the battery modules, a second module connection of a first of the battery modules—via a second of the semiconductor switch elements with a third module connection of a third of the battery modules, a third module connection of the first of the battery modules—via a third of the semiconductor switch elements with a second module connection of a fourth of the battery modules, and a fourth module connection of the first of the battery modules—via a fourth of the semiconductor switch elements with a first module connection of fifth of the battery modules, depending upon the switching states of such semiconductor switch elements. This can create high flexibility within the battery with respect to the use of the battery cells or battery modules.

Preferably, the first, second, third, fourth, and fifth battery modules are arranged spatially immediately next to each other. This results in a particularly simple, especially two-dimensional matrix structure, implementing the concept of the invention in a very simple way.

In addition, it is suggested that the battery comprises at least three battery terminal poles, wherein a respective battery terminal pole is electrically connectable via the respective semiconductor switch element with a module connection of at least two respective battery modules, depending upon the switching state of such semiconductor switch elements. This makes it possible to expand the circuit structure used in the invention to the batter terminal poles. It is also possible to provide via the battery terminal poles at least two pre-set voltages nearly independently from each other. Preferably, these voltages can be totally different in their nature. If four battery terminal poles are available, it can even be provided that at least two voltages can be provided in electrically separate ways, especially galvanically separately. This way the invented battery makes it possible to provide electric networks with separate potentials. The number of battery terminal poles can also be chosen as needed. According to the required functionality, the battery terminal poles are respectively connectable via the respective semiconductor switch elements with the battery modules.

With respect to the invented battery module, it is especially suggested that it comprises a series connection of multiple battery cells. This provides the above mentioned electric safety and simplified assembly. It is particularly beneficial if the battery module comprises battery cells, which comprise a galvanic cell, a first semiconductor switch element, a first cell terminal, which is directly connected in electric way with a first potential connection of the galvanic cell, and a second cell terminal, which is electrically connected via the first semiconductor switch element with a second potential connection of the galvanic cell, wherein the battery cell further comprises a third cell terminal electrically connected with the second potential connection of the galvanic cell, a second semiconductor switch element, and a fourth cell terminal, which is electrically connected via the second semiconductor switch element with the first potential connection of the galvanic cell. This creates a battery cell, which comprises, similarly to the battery module, four cell terminals. This specific cell structure makes it possible with a pre-set series connection, already by means of a battery module, to provide a changed voltage in a highly flexible manner at its module connections.

It is particularly beneficial here if the battery cells are connected in series, at least partially, and the series connection is connected with the first end to the first and/or second module connection and with the second end to the third and/or fourth module connection, where in order to create the series connection, the first cell terminal of the respective first of the battery cells is electrically connected with the second cell terminal of the respective second of the battery cells and the third cell terminal of the respective first of the battery cells is electrically connected with the fourth cell terminal of the respective second of the battery cells, and a control unit is connected at least to these first and second semiconductor switch elements of the respective battery cells, in order to operate the semiconductor switch elements depending on the pre-set voltage. This can further increase flexibility of voltage provision at the terminal poles of the battery. Namely, the circuit structure used in the invention makes it possible to provide with the battery cells of the battery module not only positive voltages at module connections, but also negative voltages at the same module connections, depending upon what switching state the respective semiconductor switch elements can be in.

It is further suggested that at least one module switch element is connected between the first and second module connections and/or between the third and fourth module connections, and such element makes, depending upon the switching state, the first module connection electrically connectable to the second module connection, and the third module connection with the fourth module connection. This way the connection of module connections in the battery module can be controlled as required. The module switch element should preferably be designed as a semiconductor switch element.

It is further suggested that the battery module comprises at least two series connections, the first one of which is directly connected to the first and third module connections, and the second one directly connected to the second and fourth module connections. This way the series connections can be operated in parallel and thus increase performance. At the same time, arrangement of semiconductor switch elements as module switch elements between the module connections makes it possible that both series connections can also be operated independently from each other at the respective module connections. This way the battery module can be used for production of two independent voltages. This also obviously allows to provide further series connections, and activate and deactivate them, preferably by using further module switch elements, which can be switched on in parallel as needed.

Preferably each of the battery cells should have its own cell casing, in which the first and second semiconductor switch elements are arranged and which comprises at least one connection contact for each of the cell terminals, whereby connection contacts are electrically isolated from each other. This provides an easy way to achieve a modular structure of the battery, which allows to adjust the battery to specific applications in a simple way. In addition to that, the cell casing can produce a single design unit, which can be treated separately, which not only simplifies the battery production, but also makes it possible to check the basic function of each battery cell prior to production of the battery. This makes the battery production more reliable. The cell casing can also provide at least one communication interface that makes it possible to operate the semiconductor switch elements in the intended switched mode in order to produce the pre-set voltage. The cell casing can comprise at least one circuit board with at least the semiconductor switch elements arranged on it.

The cell casing may contain a mounting frame, mounting cup and/or the like made of a proper material in or on which at least some of the respective elements and/or units of the battery cell are arranged. The materials can be, for example, plastic or metal.

Preferably, the galvanic cell should be arranged in or on the cell casing. Preferably, the cell casing can, at least partially, contain or cover the galvanic cell. The cell casing can, for example, comprise one or several terminal contacts for electric contact of the potential connections of the galvanic cell. At least one terminal contact can, for example, be provided by the above said circuit board. At least one terminal contact should be preferably designed as at least one potential connection of the galvanic cell, in order to achieve this way a reliable and sustainable electric connection in the intended operations. Furthermore, the galvanic cell can be integrated with at least some of the further elements and/or units in or on the cell casing.

Mechanical and/or electrical connection means can be provided for connection of the galvanic cell with the cell casing, such as, for example, one or several screw joints, one or several clip and/or plug connectors, one or several glue, solder and/or welding connectors, combinations thereof or the like. Preferably, either a mechanical or an electrical connection can be provided by connection means. It can also be provided that the galvanic cell in the condition connected to or arranged on the cell casing is pressed with at least one of its potential connections against the respective terminal contact, for example, by spring force or the like. This design also makes it possible to produce the galvanic cells separately from the battery cells. Therefore, the galvanic cells can be manufactured in different locations, especially by different manufacturers. They can then we arranged in a separate manufacturing step in or on the cell casing.

It can further be provided that the galvanic cells are arranged in a detachable way on or in the cell casing. This makes it possible to separate the galvanic cell from further elements and/or units of the battery cell both spatially and electrically. This allows, for example, to exchange the galvanic cell when necessary. Detachable connection can, for example, consist of one or several screw joints, one or several clip and/or plug connectors and/or the like.

It can also be provided that at least the first and second semiconductor switch elements are arranged in a casing, with the casing having at least one terminal contact for each of the cell terminals, while the terminal contact are electrically isolated from each other and the casing has further terminals for connecting the galvanic cell. With this design, the galvanic cell need not be covered by the casing. It can, for example, be arranged externally. Furthermore, the galvanic cell can also be arranged on or in the casing in an exchangeable way. In particular, the galvanic cell can be detachable. The number of terminals should preferably correspond to the number of potential connections of the galvanic cell.

The benefits stated with respect to the invented battery cell, battery module, battery and motor vehicle equally apply to the method of the invention and vice versa. Therefore, in particular, apparatus features can be formulated for method features and vice versa.

The invention also covers further embodiments of the method of the invention, which comprise features as they are already described in connection with the further embodiments of the invented battery, battery module, and motor vehicle. For this reason, the respective further embodiments of the method of the invention are not described here again.

The invented motor vehicle should preferably be designed as an automobile, especially a passenger car or a truck, or as a passenger bus or a motorcycle.

The invention also covers combinations of features of the described embodiments.

BRIEF DESCRIPTION OF THE FIGURES

Below are the embodiment examples of the invention shown in the following pictures.

DETAILED DESCRIPTION

The exemplary embodiments explained in the following are preferred embodiments of the invention. In the exemplary embodiments, the respective components of the embodiments represent individual features of the invention, to be considered independently of one another, which also further develop the invention independently of one another. In addition, the embodiments described can also be supplemented with other previously described features of the invention.

In the figures, the same reference symbols always designate elements with the same function.

Figure 1:
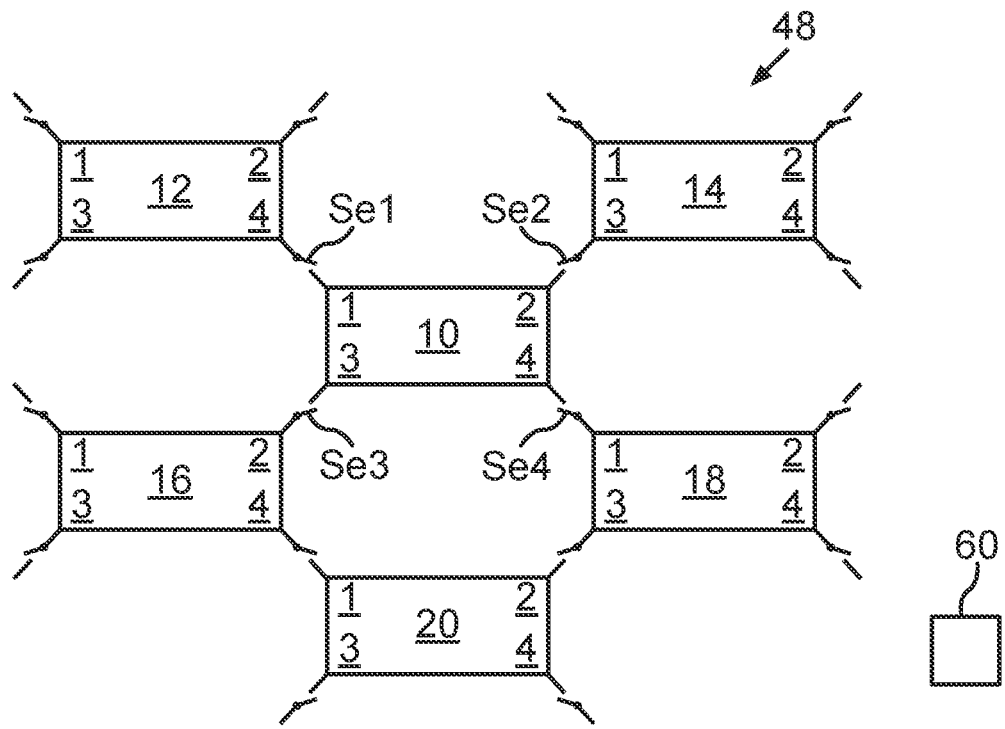
FIG. 1 a schematic block diagram of a battery with battery modules with a circuit structure of the matrix arrangement type, whose module connections are electrically connectable by means of semiconductor switch elements.

FIG. 1 is a schematic block diagram representing a section of a circuit structure of a battery 48, which has a plurality of battery modules 10, 12, 14, 16, 18, 20 arranged adjacent to one another, each having four module connections 1, 2, 3, 4 and a plurality of semiconductor switching elements Se1, Se2, Se3, Se4. The battery 48 comprises additional battery modules and semiconductor switching elements (not shown), with which the structure is continued correspondingly.

Figure 4:
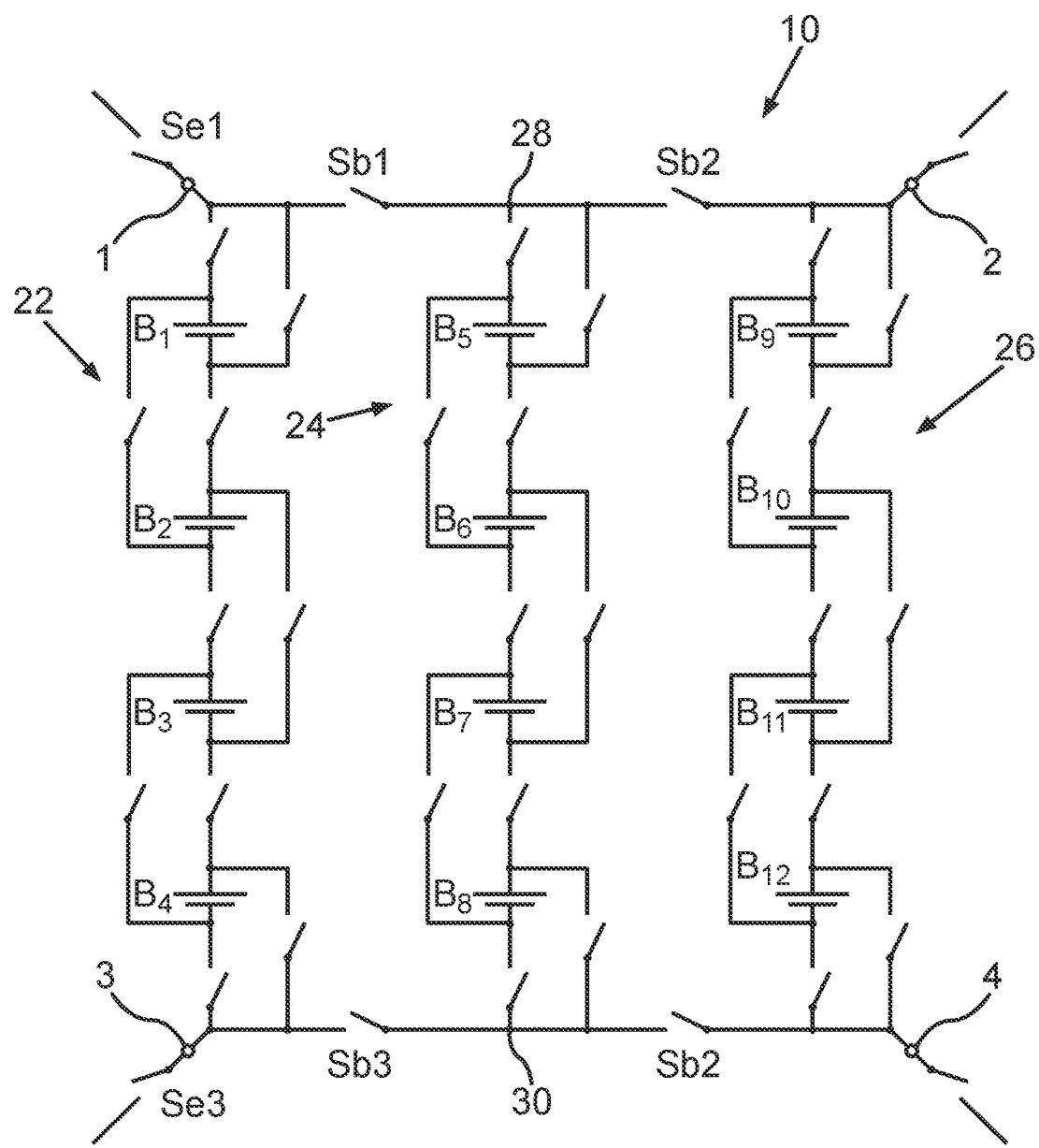
FIG. 4 a schematic circuit diagram of a battery module of the battery according to FIG. 1.
Figure 5:
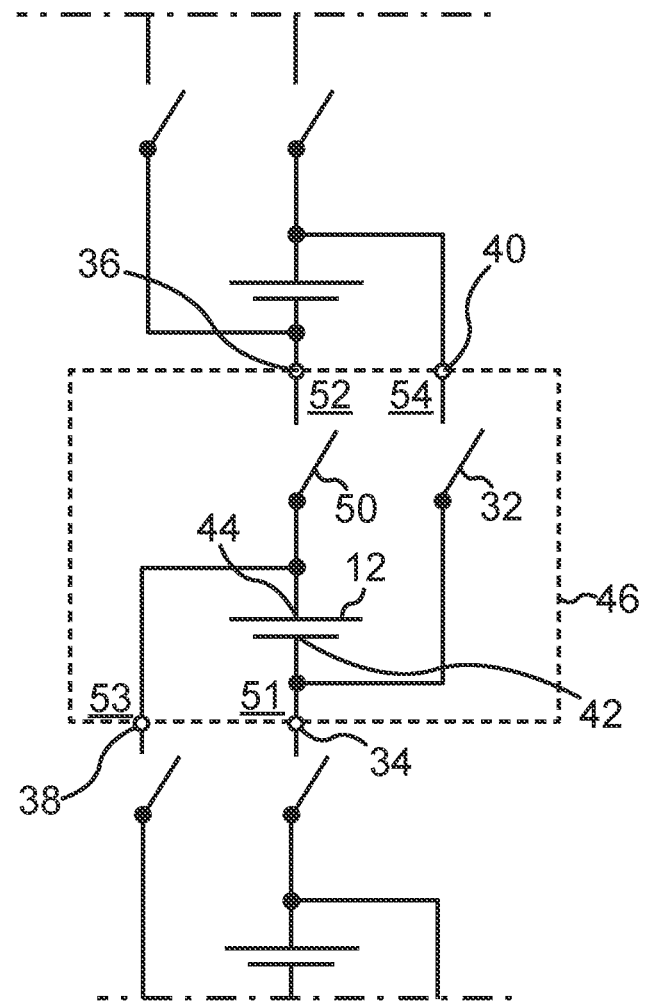
FIG. 5 a schematic circuit diagram of a battery cell of the battery module according to FIG. 4.

Each of the battery modules 10, 12, 14, 16, 18, 20 has three series circuits 22, 24, 26 of battery cells 46 (FIGS. 4 and 5). In the present circuit structure it is provided that a first module connection 1 of a first one of the battery modules 10 can be coupled electrically over a first one of the semiconductor switching elements Se1 with a fourth module connection 4 of a second battery module 12, a second module connection 2 of the first battery module 10 over a second semiconductor switching element Se2 with a third module connection 3 of the third battery module 14, a third module connection 3 of the first battery module 10 over a third semiconductor switching element Se3 with a second module connection 2 of a fourth battery module 16 and a fourth module connection 4 of the first battery module 10 over a fourth semiconductor switching element Se4 with a first module connection 1 of the fifth battery module 18, depending on the switching status of these semiconductor switching elements Se1, Se2, Se3, Se4. In FIG. 1 the semiconductor switching elements Se1, Se2, Se3, Se4 are shown in the deactivated state.

The semiconductor switching elements Se1, Se2, Se3, Se4 as well as the semiconductor switching elements described in the following currently exist as a kind of MOSFET. In alternative embodiments, naturally another kind of semiconductor switching element may be provided, for example an IGBT or the like.

The number of semiconductor switching elements between the battery modules shown in FIG. 1—depending on the application or the need—can be reduced to a defined number or expanded. The tapping possibilities of the phased potentials generated can take place either over a central interface in the middle of the battery module or over a corresponding number of external tapping points or tapping lines on the periphery of the battery system, for example battery terminals.

Depending on the closing of the semiconductor switching elements between the battery modules, various combinations and therefore either series or parallel connections of battery modules can be achieved. If, tor example, in a multi-phase system, all battery modules 10, 12, 14, 16, 18, 20 shown are assigned a single phase potential and only the battery modules 10, 14, 18 or individual battery cells of these battery modules are required for generating this potential phase, for example phase 1, the module matrix offers some advantages.

On one hand, faster bypassing of battery modules that are not currently required, here for example battery modules 16 and 20, is possible by realizing a direct connection between the modules 10 and 18 by closing the intervening semiconductor switching elements. With this, battery modules 16 and 20 need no longer carry additional current. On the other hand, these battery modules, now also including the battery module 12 which is also not required, can be used for potential generation of one or more additional phase potentials.

Figure 2:
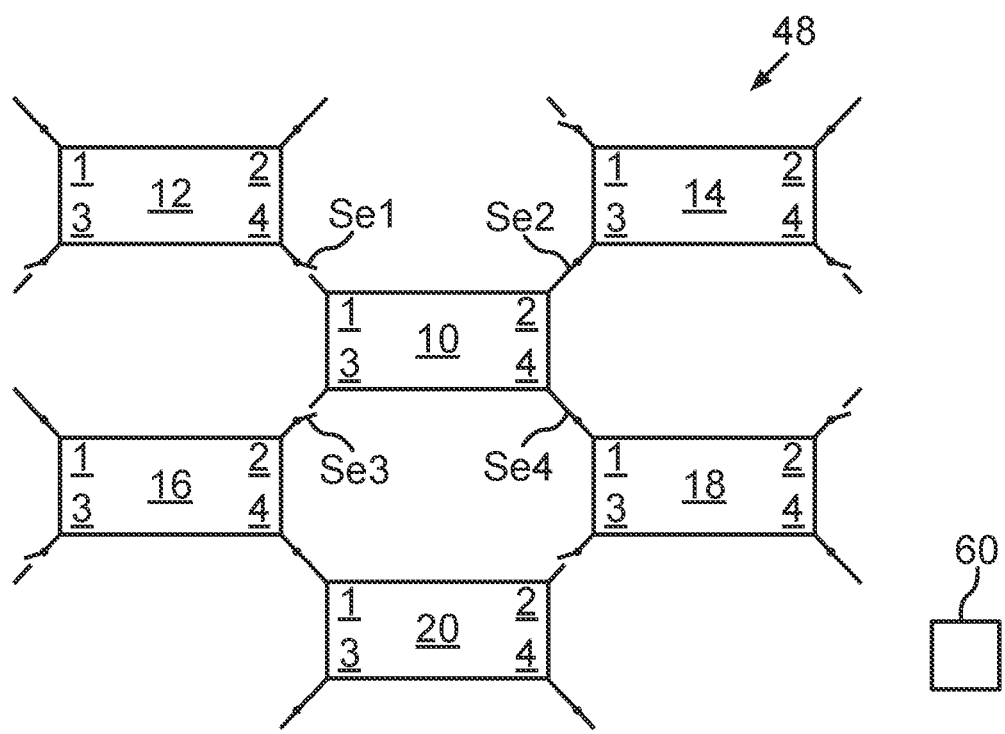
FIG. 2 a schematic block diagram as in FIG. 1 in the first operating state.

In a schematic cutaway view, FIG. 2, like FIG. 1, shows a first operating state of the battery 48, in which the battery modules 10, 14, 18 are connected in series via the semiconductor switching elements Se2, Se4 to supply a specified electrical potential to battery terminals (not shown) of the battery 48. The switching status of the semiconductor switching elements Se1, Se2, Se3, Se4 is primarily provided only for a short time period. Specifically, the battery 48 is primarily designed to provide an alternating current at its terminals, namely a triphasic alternating current, to supply a vehicle electrical power system 70 of a motor vehicle 68 with electrical energy (FIG. 6).

Figure 6:
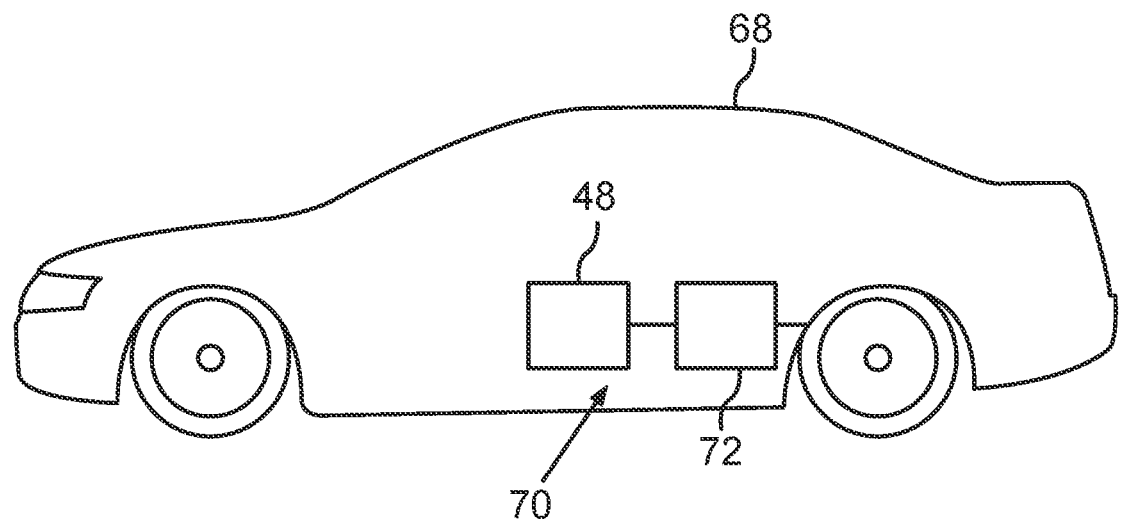
FIG. 6 a schematic circuit diagram of a motor vehicle with driving equipment and a battery according to FIG. 1.

FIG. 6 shows the motor vehicle 68 in a schematic side view. The vehicle electrical power system 70 comprises the battery 48 and a synchronous motor 72 as the drive equipment. In the present case the synchronous motor 72 is designed as a three-phase alternating current motor. The synchronous motor 72 is connected directly to the battery 48, so that a separate inverter is not required.

By means of a control unit 60, the battery 48, specifically its semiconductor switching elements, especially comprising its semiconductor switching elements Se1, Se2, Se3, Se4, are operated such that the three phases of the alternating current for the synchronous motor 72 can be supplied appropriately by operating the battery 48 in the manner of a multi-level energy converter.

An exemplary circuitry with assignment of individual battery modules to different phases is, for example: battery modules 10, 14 and 18 to phase 1, battery module 12 to phase 2 and battery module 16 and 20 to phase 3.

Figure 3:
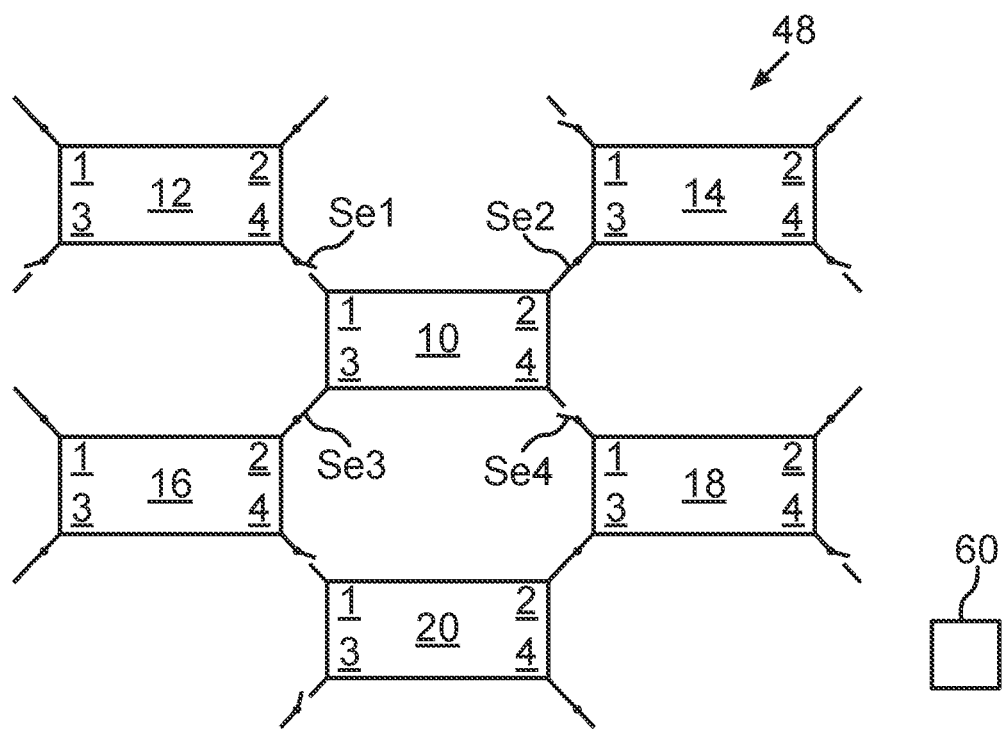
FIG. 3 a schematic block diagram as in FIG. 1 in the second operating state.

In a further schematic representation, FIG. 3, like FIG. 1, shows a second operating state of the semiconductor switching elements Se1, Se2, Se3, Se4, according to which the battery modules 10, 14, 16 are now connected in series so that they can supply another desired momentarily present specified electrical potential to the battery terminals. Depending on the magnitude of the electrical potential to be supplied and also depending on the demands on the battery modules 10, 12, 14, 16, 18, 20, by correspondingly setting the semiconductor switching elements Se1, Se2, Se3, Se4 and the additional, unnamed semiconductor switching elements, the desired operating states for supplying the specified electrical potential can be assumed. In this process it may be provided that battery modules 10, 12, 14, 16, 18, 20 will be activated or deactivated temporarily.

Because of the change in the phase potentials over time compared with FIG. 2, the required potential amplitudes and thus the allocation to the battery modules will change. In the next time step according to FIG. 3, for example, the battery modules 10, 14 and 16 will be needed for generating phase 1. As a result, the selection of battery modules shown in FIG. 3 can be subdivided, wherein once again all battery module modules are used and are to be assigned to the phase potentials to be formed.

FIG. 3 shows the circuitry and the assignment of individual battery modules to different phases in the next time step: for example, battery modules 10, 14 and 16 to phase 1, battery module 12 to phase 2 and battery modules 18 and 20 to phase 3.

FIG. 4 in an exemplary schematic circuit diagram shows one of the battery modules 10 of battery 48 from FIGS. 1 to 3. The additional battery modules 12, 14, 16, 18, 20 are designed correspondingly in the present case. This may also differ in alternative embodiments.

It is recognizable in FIG. 4 that the module connections 1 and 2 can be electrically coupled with one another over two semiconductor switching elements Sb1 and Sb2 connected in series. The same configuration is also recognizable for the module connections 3 and 4, which can be electrically coupled with one another over a series circuit of semiconductor switching elements Sb3 and Sb4. The semiconductor switching elements Sb1, Sb2, Sb3, Sb4 can be designed like the other semiconductor switching elements Se1, Se2, Se3, Se4. However, they may also be designed differently as needed.

The first and the third module connections 1, 3 can be electrically coupled with one another over the series circuit 22 consisting of four battery cells B1, B2, B3, B4 and two additional semiconductor switching elements S9 and S10. Correspondingly, the module connections 2 and 4 can be electrically coupled with one another over the series circuit 26 consisting of battery cells B9, B10, B11, B12 and semiconductor switching elements S29, S30.

A center connection 28 of the semiconductor switching elements Sb1, Sb2 connected in series can be coupled electrically over the series circuit 24 consisting of battery cells B5, B5, B7, B8 and semiconductor switching elements S19 and S20 with a center connection 30 of the series circuit of the semiconductor switching elements Sb3 and Sb4. The series circuits 22, 24, 26 in this case are of essentially the same construction. This may also be made different if necessary.

FIG. 5 shows, in a schematic circuit diagram representation, a single one of the battery cells B1 to B12, which is designated with the reference symbol 46 in FIG. 5. Each of the battery cells 46 in the present case has a single galvanic cell 12. The battery cell 46 serves as an element for the modular construction of the battery module 10, 12, 14, 16, 18, 20, especially of the series circuits 22, 24, 26.

The galvanic cell 12 is designed as an electrochemical cell and has two electrodes, which form a first potential connection 42 and a second potential connection 44. In the present configuration, the galvanic cell 12 is designed as a lithium ion cell. In alternative configurations, another galvanic cell may also be provided here, for example a lead-acid cell or the like.

The battery cell 46 has a first cell connection 34, which is directly electrically coupled with the first potential connection 42 of the galvanic cell 12. In addition, the battery cell 46 has a second cell connection 36, which is electrically coupled over a first semiconductor switching element 50 of the battery cell 46 with a second potential connection 44 of the galvanic cell 12. The first semiconductor switching element 50 in the present case is made of a transistor, namely a field effect transistor of the MOSFET type. Naturally, another transistor, for example an IGBT or the like, may also be used alternatively.

The battery cell 46 also comprises a third cell connection 38, a second semiconductor switching element 32, which may be essentially designed like the first semiconductor switching element 50, and a fourth cell connection 40, which is electrically coupled over the second semiconductor switching element 32 with the first potential connection 42 of the galvanic cell 12. Thus in the present case the battery cell 46 has four cell connections 34, 36, 38, 40. Through this specific circuit structure of the battery cell 46, specific functionalities can be achieved during the operation of a battery module 10 constructed with these battery cells 46.

It is apparent from FIG. 4 that the battery cells B1, B2, B3, B4, B5, B6, B7, B8, B9, B10, B11, B12, which correspond to the battery cell 46, are connected into the three series circuits 22, 24, 26. If the semiconductor switching elements Sb1, Sb2, Sb3, Sb4 are in the "off" switching status, the die series circuits 22, 26 can essentially be operated independently from one another, and correspondingly can be used for supplying differing electrical potentials. The series circuit 24 is not activated in this operating state.

Through the battery cells 46 it is possible to make a potential of the respective battery modules 10, 12, 14, 16, 18, 20 variable, even with respect to the potential to be provided at the module connections 1, 2, 3, 4. With the circuit structure of the battery cells 46 it is even possible to achieve alternating currents as needed at the module connections 1, 2, 3, 4. In connection with the circuit structure of the battery 48 according to FIG. 3, therefore, almost any desired potential form can be achieved in a highly dynamic way with regard to the chronological course as well. In addition, depending on the need, it may be provided that, for example, semiconductor switching elements Sb1 and Sb3 or semiconductor switching elements Sb2 and Sb4 are switched to the "on" status to allow parallel connection of series circuit 24 either to series circuit 22 or to series circuit 26. Naturally, it may also be provided that all of the semiconductor switching elements Sb1, Sb2, Sb3, Sb4 are in the "on" switching status in order to connect the three series circuits 22, 24, 26 in parallel. Depending on the need, this can also be changed during operation. By way of the specific circuit structure it is possible that each of the series circuits 22, 24, 26 may provide an individual electric potential, which in the present case is an alternating current.

As is apparent from FIG. 4, however, the battery module 10 can also be bypassed very simply in that either only the two "top" semiconductor switching elements (Se1, Se2) or the two "bottom" semiconductor switching elements Se3, Se4 or one upper and one lower semiconductor switching element in the given case along with the corresponding semiconductor switching elements within a backbone, for example S1, S4, S5, S8, S9, can be closed, so that all battery cells are bypassed.

In addition, the battery 48 comprises a control unit 60 to which all the semiconductor switching elements of the battery 48, the battery modules 10, 12, 14, 16, 18, 20 and also all battery cells 46 are connected. By appropriately switching the semiconductor switching elements, not only can the individual battery cells 46 in the battery modules 10, 12, 14, 16, 18, 20 be activated or deactivated as needed, to supply a potential as needed at the module connections 1, 2, 3, 4 according to the respective specified electrical alternating current, but the possibility also exists of further increasing the flexibility by activating respective battery modules. In particular, the possibility exists of completely activating or deactivating individual battery modules or even making them available in normal operation to another potential supply line. In this way it is possible for the battery 48 not only to accomplish the functionality of a three-phase inverter of the multi-level energy converter type, but also to supply a plurality of greatly differing electrical potentials almost simultaneously. In this process, with the circuit structure according to the invention, it is possible to supply both positive and negative electrical potentials against a battery reference potential connection and/or battery reference potential. In addition, it is also possible to vary amplitudes and/or phase shifts in the case of alternating current potentials when, for example, this is desired in normal operation of the synchronous motor 72 or the like.

The layout of the battery modules 10, 12, 14, 16, 18, 20 can take the form of a module matrix, wherein the battery modules 10, 12, 14, 16, 18, 20, in contrast to a pure series connection thereof, are connected with more than just two adjacent modules over the semiconductor switching elements designed as circuit breakers, giving the possibility of connecting the battery modules together in any order, separating them galvanically, bypassing individual battery modules or generating individual DC potentials, for example using them for a vehicle electrical system power supply.

The following additional effects can also be achieved with the invention:

For example, utilization of the resources of battery cells temporarily actually switched as inactive can be realized by modularity of the battery cells. In contrast to the case of multi-level energy converters of the prior art, the modularity of the topology according to the invention can be achieved, for example, not by simply connecting battery modules in series, for example within a phase, but to some extent by a module matrix, in which a battery module can be connected with more than two nearby battery modules, for example z nearby battery modules, wherein z corresponds to the number of power switches via which the respective battery module can be electrically connected with other battery modules. Thus z different current paths through one module are possible.

This functionality facilitates or enables the formation of positive and negative initial potential levels; in other words, it thus integrates the ability for polarity reversal of the initial potentials. It is also possible to equip each of the individual battery modules in the battery with a different number of semiconductor switching elements outside of the battery module, for example $z_i$, wherein i corresponds to the i-th battery module, so that the number of module connections can vary. This is advantageous in that the number of nearby battery modules of a battery module located in the interior of a battery can differ from that of a module on the edge of the battery. This modularity need not be limited to one plane of the battery, i.e., to two dimensions, but a three-dimensional structure of a large number of battery modules is also conceivable.

The allocation of the battery modules to the individual phases and the production of the gate signals for the semiconductor switching elements between the individual battery modules can be generated using appropriate modulations/actuation methods. In this process the generation of the switching signals for the semiconductor switching elements between the battery modules can be selected to occur in such a form that ideally these only change at a low frequency, and thus the occurring switching losses are small. This is recognizable, for example, from the allocation of battery module 12 in the previously shown FIGS. 1 to 3, since the presentation of this battery module over more than one time step away and along with this, the switch positions of the semiconductor switching elements surrounding the battery module, do not change.

In view of the existing advantage that individual battery modules with the suggested topology can likewise be used for supplying a constant DC potential, for example, battery module 12 in FIG. 2 and FIG. 3 can also be used for this purpose and deliver the required vehicle electrical system potential, which for example can amount to 48 V, over a long interval, and consequently with the proposed switching concept/topology the combination of a DC/AC and a DC/DC converter/a DC-AC/DC inverter can be realized with the battery 48.

As was previously mentioned, the module matrix need not be limited to one plane, but can also be expanded to multiple planes.

Likewise, different connection topologies of the battery cells 46 can be realized within the various battery modules. A large selection of topology variants with p parallel-connected battery cells or sections as well as m series-connected battery cells can be implemented.

FIG. 5 shows a possible connection topology for the battery module, wherein a total of twelve battery cells 46 are integrated in this example module 10. In each case four of these twelve battery cells B1 . . . B4; B5 . . . B8; B9 . . . B12 form a "backbone"/module section and are thus connected to one another over a semiconductor switching element, for example S3, between a negative terminal of one battery cell, for example B1, and a positive terminal of the next battery cell, for example B2. In addition, another semiconductor switching element, for example S4, is present between the positive terminal of the first-named battery cell, for example B1, and the negative terminal of the next battery cell in the sequence, for example B2.

The topology shown allows a polarity reversal, in other words, it has the functionality of producing positive and negative output potential levels. Thus in addition to the individual battery modules it also increases the number of possible potential levels of the multi-level energy converter supplied with the battery 48.

Around the battery module 10 are four external semiconductor switching elements Se1, Se2, Se3, Se4 for combination/connection with other battery modules. The semiconductor switching elements Sb1, Sb2, Sb3, Sb4 within the battery module additionally allow the connection or the uncoupling of individual sections with/from one another as well as the possibility of current conduction starting from any of the external semiconductor switching elements Se1, Se2, Se3, Se4 through the battery module to another arbitrary one of these four semiconductor switching elements.

Figure 7:
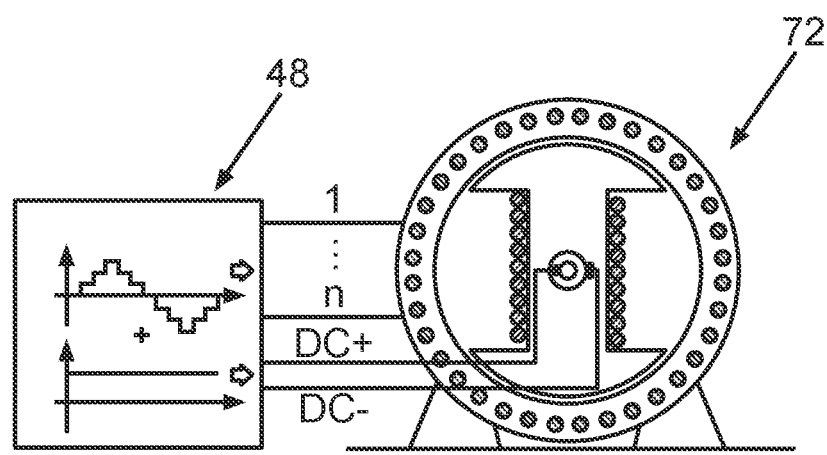
FIG. 7 a schematic presentation of a battery according to FIG. 1 with a three-phase externally excited synchronous machine connected to it.

FIG. 7 is a schematic representation of the externally excited synchronous motor 72 connected to the battery 48 according to FIG. 1. It is recognized that depending on the phases, phase potentials can be directly supplied from the battery 48 as alternating current for the synchronous motor 72. In addition, the battery 48 makes available a direct current that serves to excite a rotor winding of the synchronous motor 72. With this principle, for example, it is possible not only to guarantee the excitation of the synchronous motor 72 in the form of both the excitation circuit and the rotor circuit, but also, for example, to make a contribution to a low-potential vehicle electrical system of an electric vehicle, for example a low-potential vehicle electrical system or the like. A separate energy converter is no longer necessary for this purpose. This concept also makes it possible to optimize the battery system and especially to use almost the entire available potential of the total number of battery cells at any time. Thus the battery 48 not only serves to supply a direct current, but also serves as a multi-level energy converter to supply corresponding alternating currents.

Figure 8:
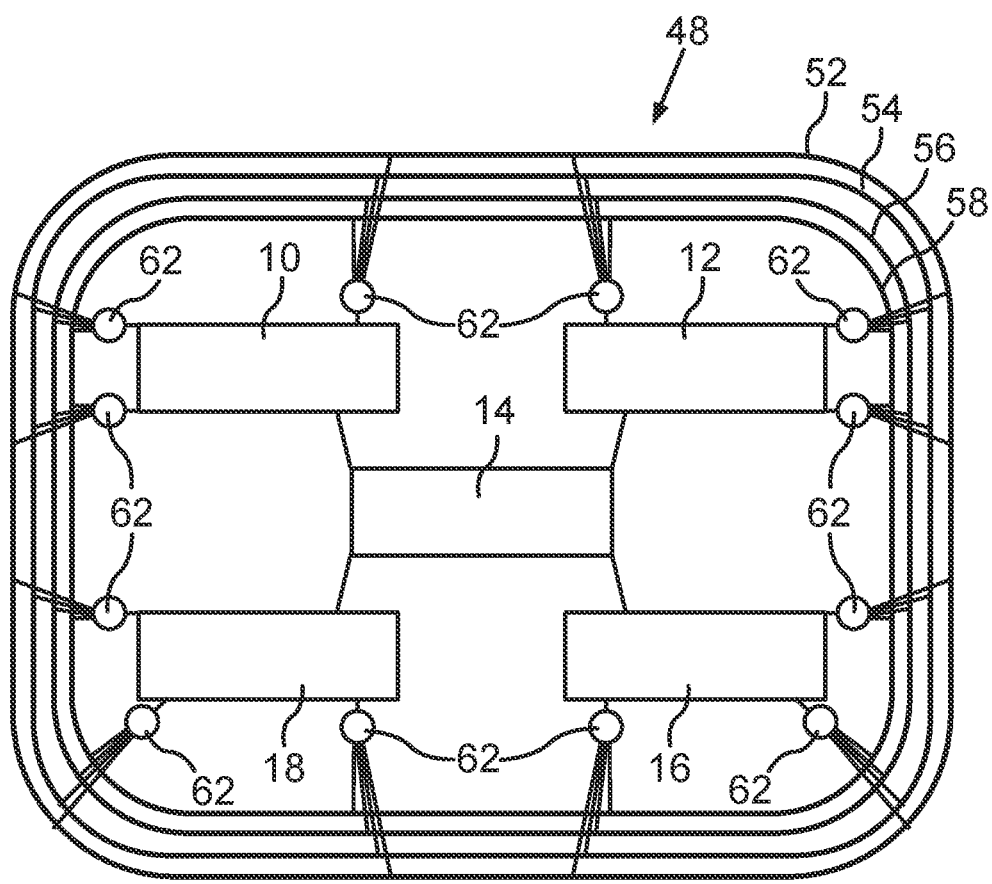
FIG. 8 a schematic circuit diagram of the battery according to FIG. 7 with terminal pole cables.

FIG. 8 shows an additional schematic representation of the battery according to FIG. 1, in which additional terminal lines 52, 54, 56, 58 are shown, to which terminals of the battery 48 are connected. In the present case, the terminal lines 52, 54, 56, 58 each have a ring structure. The ring structure can be at least partially spatially positioned inside and outside of the battery 48. In the configuration shown in FIG. 8, only four terminal lines are shown; specifically, the terminal lines necessary for supplying the three-phase alternating current. Two additional terminal lines will be required for supplying direct current. Additional ring lines will also be needed for generating an increased number of alternating currents.

It is also apparent from FIG. 8 that the battery 48 correspondingly has four terminal lines 52, 54, 56, 58, electrically connected to the battery terminals (not shown) independently of one another for supplying the three phase potentials of the three-phase alternating current. The battery 48, at least for some of the battery modules 10, 12, 14, 16, 18, has a circuit structure in which at least one of the module connections 1, 2, 3, 4 of at least two different battery modules, here battery modules 10, 12,16, 18, each is or can be electrically coupled over respective connecting contact elements 62, independent of their switching states, with a respective terminal line 52, 54, 56, 58. In this way a respective battery module 10, 12, 16, 18 can be electrically coupled directly in a highly flexible manner with the terminal lines 52, 54, 56, 58. In the present case, the terminal lines 52, 54, 56, 58 are assigned as follows:

Terminal line 52 is assigned a zero potential, while the connection lines 54, 56, 58 are assigned to respective phases L3, L2, L1.

According to the number of terminal lines 52, 54, 56, 58, the connection switching elements 62 have switching elements (not shown) which make it possible to individually electrically couple one of the four module connections 1, 2, 3, 4 to one of the battery modules 10, 12, 16, 18 respectively with one of the terminal lines 52, 54, 56, 58. In this way, the battery modules for the potential supply can be arranged in almost any desired way.

The semiconductor switching elements, especially the semiconductor switching elements SE 1, SE 2, SE 3, SE 4 and the connection switching elements 62, are activated by the control unit 60, depending on the electrical potentials predetermined by the battery 48 in order to supply the specified electrical potentials at the battery terminals.

Figure 9:
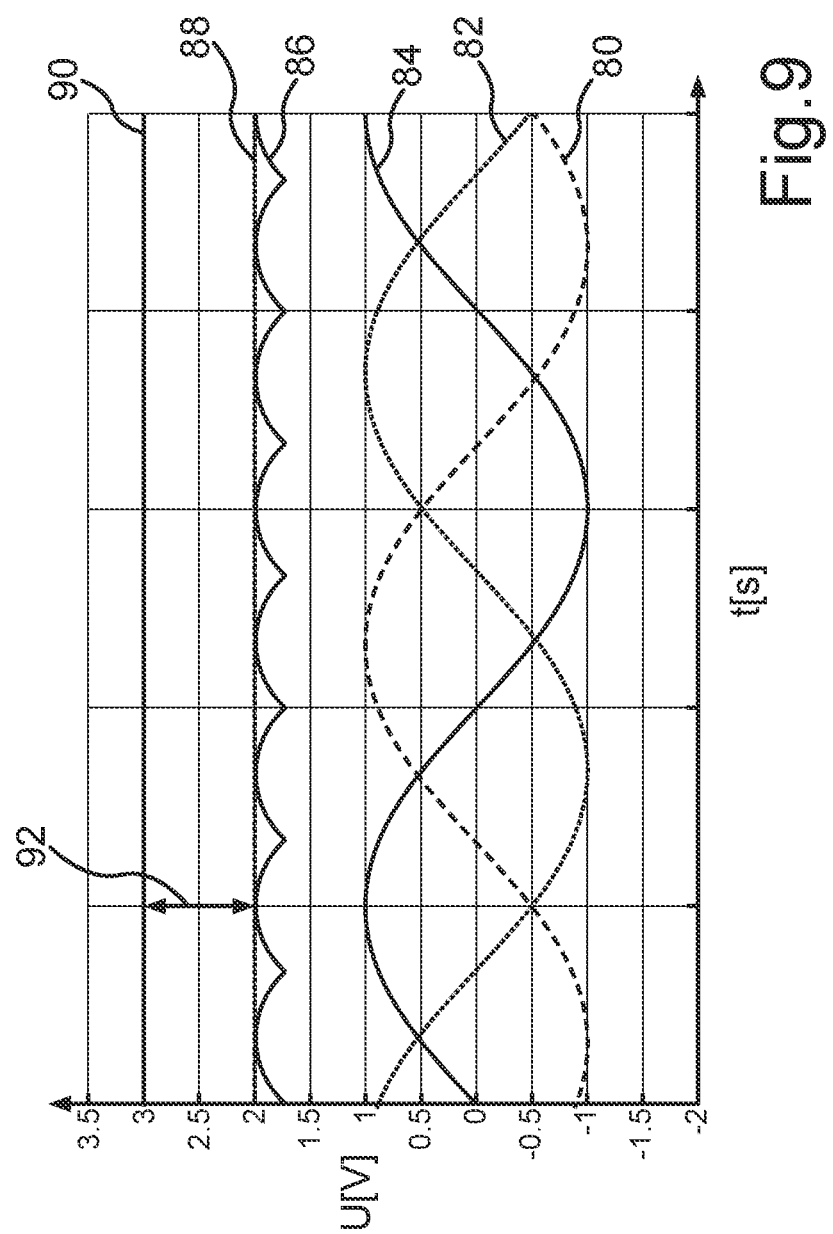
FIG. 9 a schematic diagram for use of battery according to FIG. 1 when producing a three-phase alternating current.

FIG. 9 shows a schematic representation of an actual battery utilization, an available service capacity, an energy buffer and the three phase potentials of the alternating current over a period of time. The time is shown on an abscissa, while a normalized potential is shown on an ordinate. The three phase potentials of the alternating current are shown by curves 80, 82, 84. It is apparent that their amplitudes are normalized to a value of 1. A curve 86 shows potential utilization corresponding to the supplying of the phase potentials, which corresponds to the sum of the contributions of the three curves of the respective phases of the alternating currents 80, 82, and 84. A curve 88 characterizes an actually used maximum service capacity of the battery 48.

It is recognizable that the maximum service capacity has a normalized potential value of 2. An additional curve 90 characterizes the total service capacity available from the battery 48 when all battery modules of the battery 48 are used. The curve 92 characterizes an energy buffer, which corresponds to a difference between the curve 90, which in the present case corresponds to the normalized potential with the value of 3, and the maximum service capacity actually utilized. For normal operation of the battery 48 to supply three-phase alternating current, the battery 48 would only have to be designed for the maximal service capacity actually utilized according to the curve 88. Thus with regard to this application the energy buffer 92 represents a kind of oversizing, which not only can provide flexibility of the battery 48, but also can provide reliability, since it makes it possible to exclude defective battery modules or malfunctioning battery modules from utilization and instead introduce battery modules of the energy buffer corresponding to the utilization.

The essentially comparable situation also arises for multiples of three-phase alternating currents, for example six-phase alternating currents, nine-phase alternating currents or the like. Similar orders of magnitude for the energy buffer result.

Figure 10:
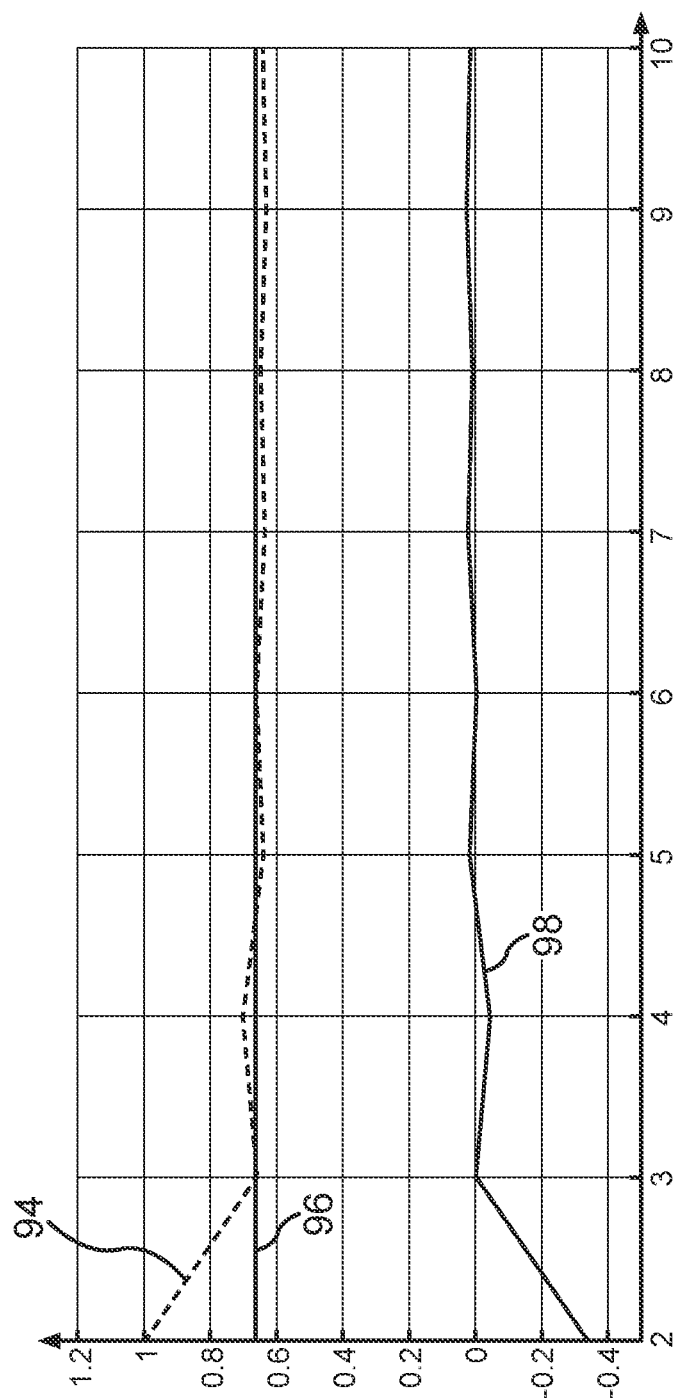
FIG. 10 a schematic diagram of the effect of changing arrangement of battery modules when producing a multi-phase alternating current depending upon the number of phases of the alternating current.

FIG. 10 shows, in a schematic diagrammatic representation, the effect of the variable assignment of battery modules in supplying multi-phase alternating current depending on the number of phases of the alternating current. An abscissa of the diagram is assigned to the number of phases, while an ordinate is assigned to a normalized active utilization of the battery 48. This corresponds to the relative share of currently actively utilized battery cells or battery modules, which is shown by the curve 94 in the diagram according to FIG. 10. This is a ratio of the actively utilized battery cells or battery modules relative to the total number of battery cells or battery modules. A two-thirds value is shown by a curve 96. It is apparent from FIG. 10 that the curve 94—except for the case of two phases—corresponds essentially to the curve 96. With the curve 98, a deviation in regard to the total available service capacity of the battery 48 is indicated.

FIG. 10 shows that an unused service capacity of the battery 48 of about one-third is enduringly present for supplying a multi-phase alternating current with more than two phases. This service capacity can be used for optimizing the operation of the battery 48. It must be noted here that the unused service capacity always exist in the form of different or chronologically varying battery modules or battery cells, since for supplying the potential of the phase potentials, battery cells or battery modules are preferably selected which make it possible to best emulate the phase potential currently to be supplied, for example considering balancing or the like.

As a result it is possible to use temporarily deactivated battery modules or battery cells for supplying other phase potentials. This is possible, among other things, because the phase potentials, which represent individual alternating currents, are shifted in their phase position relative to one another. The phase shift between the individual phases is preferably the same for all the phase potentials relative to one another, wherein at least one value of the phase shift may be dependent upon the number of phases. Thus in the case of a three-phase alternating current, the phase potentials are usually phase-shifted by about 120° relatively to one another. Corresponding considerations apply for a larger number of phases.

It is also possible to realize a variable neutral point shift if the battery 48 is used to supply the three-phase alternating current as an alternating current based on a neutral point. In this case it is possible for the neutral point of the phase potentials to be propagated through the battery 48 or the battery module. Naturally, the possibility also exists of integrating several neutral points or phase taps that may be activated or deactivated as needed.

Figure 11:
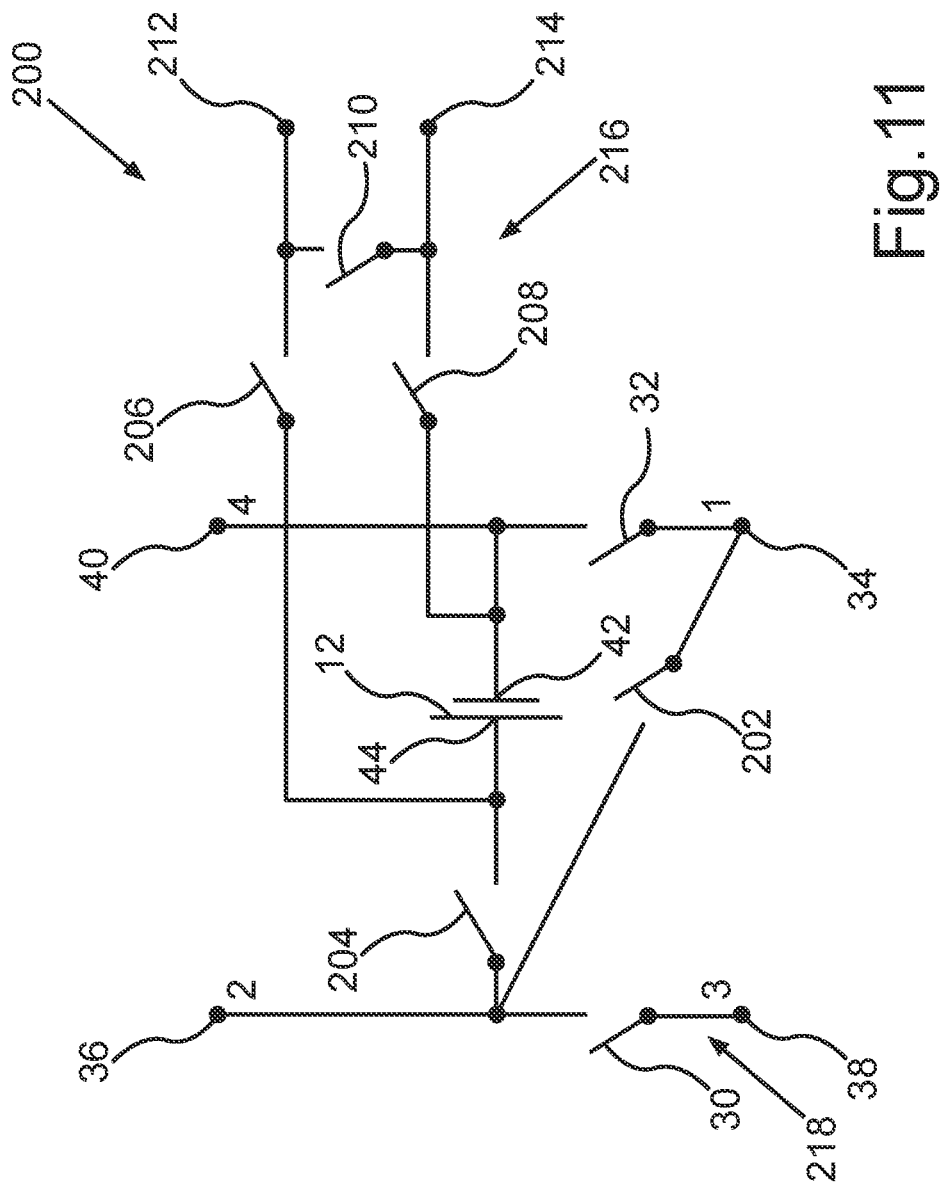
FIG. 11 a schematic circuit diagram of a battery cell with four first and two second cell terminals.

FIG. 11 shows, in a schematic circuit diagram similar to FIG. 5, a battery cell 200 with four first cell connections 34, 36, 38, 40, also called main connections, and two second cell connections 212, 214, also called shunts. The first cell connections 34, 36, 38, 40 are coupled electrically over a first switch unit 218 with a galvanic cell 12 of the battery cell 200. The electrical coupling takes place depending upon a respective switching status of the first switch unit 218.

In addition, the battery cell 200 has a second switch unit 216, which electrically couples the galvanic cell 12, depending on a respective switching status, with the second cell connections 212, 214.

For the electrical coupling, the first switch unit 218 comprises two switching elements 30, 32. The switching element 30 is connected between the second and the third cell connection 36, 38, while the switching element 32 is connected between the first and the fourth cell connection 34, 40. The first switch unit 218 also comprises a switching element 202 which, depending on its switching status, electrically couples the first and the second cell connection 34, 36. Finally, the first switch unit 218 comprises a switching element 204, which forms a series circuit with the galvanic cell 212, connected to the second and fourth cell connections 36, 40. In this configuration the potential connection 42 of the galvanic cell 12 is electrically coupled with the cell connection 40 and the switching element 204 is electrically coupled over one of its two connections with the cell connection 36. In this way, fundamentally a functionality can be provided as was already explained based on FIG. 5. Furthermore the possibility exists of also connecting the battery cells 200 in series in reverse polarity or cascading them (FIG. 12) and nevertheless achieving the desired functionality of a battery module 220 produced from them. Using the first switch unit 218, this can be achieved by actuating the corresponding switching elements 30, 32, 202, 204.

Also, the second switch unit 216 is connected directly to the potential terminals 42, 44 of the galvanic cell 12, comprising a series circuit made of three switching elements 206, 208, 210. This series circuit is connected directly to the potential terminals 42, 44. The second cell connections 212, 214 are connected to two center taps of this series circuit. In this way, using the switching element 210, which in the present case represents a bypass switching element, bypassing the battery cell 200 for the second switch unit with regard to the second cell connections 212, 214 can be accomplished.

A bypass functionality can correspondingly also be achieved with the first switch unit 218. Depending on the polarity and switching status, however, the corresponding switching elements are to be activated here. In the case of bypass, in particular the switching element 204 can be in the "off" switching status.

Because of the circuit structure of the battery cell 200 in the present case it is possible to use the galvanic cell 12 in the simultaneous provision of two potentials electrically separated from one another. Thus the galvanic cell 12 can be used for supplying a first electrical potential in that a potential value can be made available over the first switch unit 218 to the first cell connections 34, 36, 38, 40, or it can be used for supplying a second electrical potential in that a potential value can be made available over the second switch unit 216 at the second cell connections 212, 214. Thus the battery cell 200 can be utilized for providing a respective electrical potential depending on the respective switching status of the first and the second switch units 216, 218.

The switching element 202 of the first switch unit 218 can be used to switch the polarity of the galvanic cell 12 appropriately when an electrical potential is to be provided over the first cell connections 34, 36, 38, 40. As a result of the specific circuit structure, a plurality of very different utilization possibilities can be achieved for the galvanic cell 12 or the battery cell 200.

Figure 12:
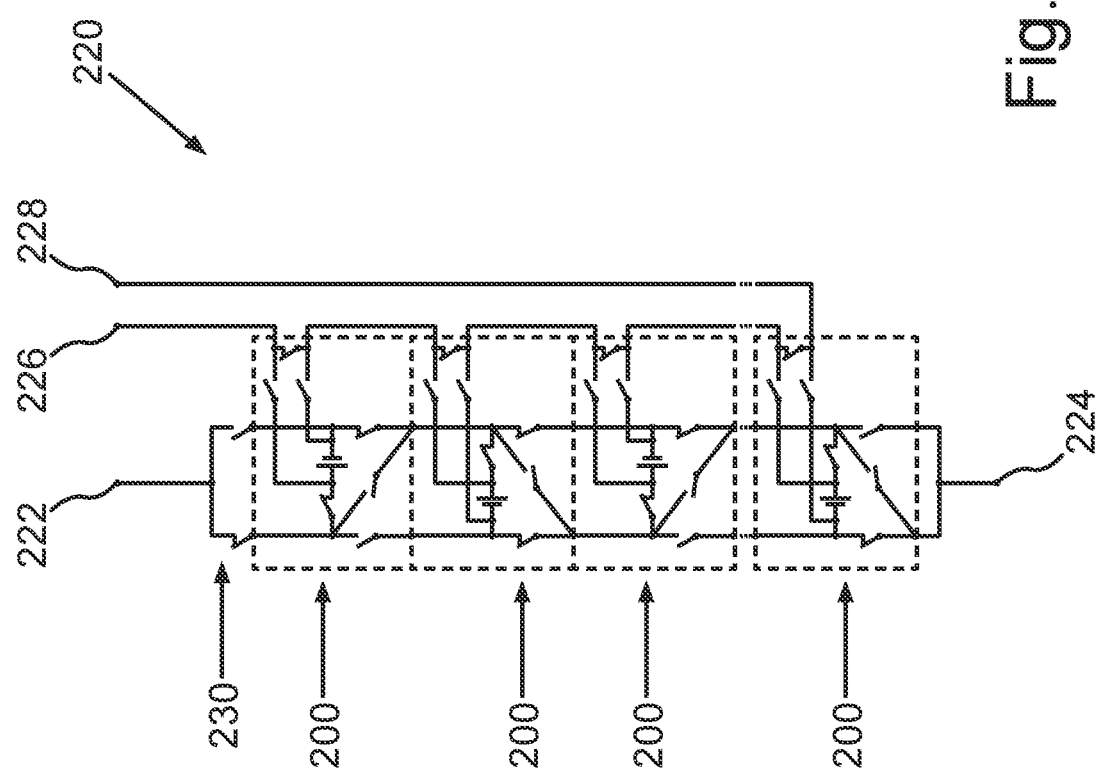
FIG. 12 a schematic circuit diagram of a battery module with battery cells according to FIG. 11.

FIG. 12, in an additional schematic circuit diagram, shows a battery module 220 in which a plurality of battery cells 200 are electrically coupled with one another by cascade or series connection with regard to the first cell connections 34, 36, 38, 40. At an upper end of the cascade circuit or series circuit a connector switch unit 230 comprising two switching elements is provided, which is connected to the second and the fourth cell connections 36, 40 of the first battery cells 200. These two switching elements provide a common connection attached to a module connection 222.

At the opposite end of the cascaded or series-connected battery cells 200, the first and the third cell connections 34, 38 of the corresponding battery module 200 are jointly connected to an additional module connection 224. In FIG. 12 a variant is represented in which the cell connections of the successive battery modules 200 are alternately replaced. In the cascade or series circuit shown in FIG. 12 it is provided that a second cell connection 36 of a first battery module 200 is connected to a first cell connection 34 of the immediately following battery module 200, while a fourth cell connection 40 of the first battery module 200 is attached to the third cell connection 38 of the immediately following battery module 200. In this way the galvanic cells 12 of the successive battery modules 200 are connected with respectively reversed polarity.

Alternatively, the cascade or series circuit can also be executed such that a second cell connection 36 of a respective battery cell 200 is connected to a third cell connection 38 of the respectively immediately following battery cell 200 and a fourth cell connection 40 of the aforementioned battery cell 200 to the first cell connection 34 of the immediately following battery cell 200. The cascade or series connection of the battery cells 200 can also be achieved in this way. Independently of the connection type selected in this regard, however, the same functionality can be achieved, wherein only the first switch unit 218 is to be correspondingly modified with regard to the switching status of its switching elements 30, 32, 202, 204.

Depending on the switching status of the first switch unit 218, the die galvanic cell 12 can be connected at least partially in parallel or at least partially in series to produce an electrical potential at the module connections 222, 224. In this way, particularly great flexibility is achieved with regard to the utilization of the battery cells 200. In particular, the configuration according to FIG. 12 has the advantage that with regard to the cascade or series circuit with the first cell connections 34, 36, 38, 40 the polarity does not have to be considered. Thus the polarity of the galvanic cell 212 does not matter in relation to the circuit structure of the first switch unit 218. This may be taken into account appropriately or compensated by corresponding operation of the first switch unit 218.

It is also apparent from FIG. 12 that the battery module 220 has two additional module connections 226, 228, at which an additional electrical potential can be provided. The second switch unit 216 of the battery cell 200 is used for this purpose. Preferably in the present case it is intended that the respective battery cell 200 will be operated, through corresponding operation of the first and the second switch units 216, 218, in such a manner that a respective one of the battery cells 200 is used exclusively for providing a respective one of the electrical potentials. Thus a respective battery cell 200 can be used either for providing an electrical potential at the module connections 222, 224 or at the module connections 226, 228. The switch unites 216, 218 are then controlled correspondingly.

In the existing configuration in FIG. 12 it is provided that the second cell connections 212, 214 are connected in series here. By means of the respective switching elements 210 of the second switch units 216 a respective battery cells 200 or the galvanic cell 12 thereof can be bypassed. This is advantageous if a corresponding potential, which in the present case for example may be a direct current, is to be provided at the module connections 226, 228. Naturally an alternative current may also be supplied here in alternative configurations.

If a battery cell 200 is used for supplying the electrical potential to the module connections 226, 228, the first switch unit 218 deactivates the use of the galvanic cell 212, in that at least its switching elements 32, 204 are switched into the "off" status. Correspondingly, the switching elements 206, 208 of the second switch unit 216 are switched into the "on" status and the switch unit 210 is switched into the "off" status. As a result, the electrical potential between the potential terminals 42, 44 of the galvanic cell 12 is also present at the second cell connections 212, 214. Depending on the desired potential at the module connections 226, 228, a corresponding number of battery cells 200 is activated to supply the potential at the module connections 226, 228.

In this operating state it can be provided that the switch unit 30 or the switch unit 202 of the first switch unit 218 is activated in order to simultaneously enable the supply of a potential at the module connections 222, 224 using others of the battery cells 200. For this purpose a corresponding activation is performed on the battery cells 200 that are mpt needed for providing the electrical potential at the module connections 226, 228.

Figure 13:
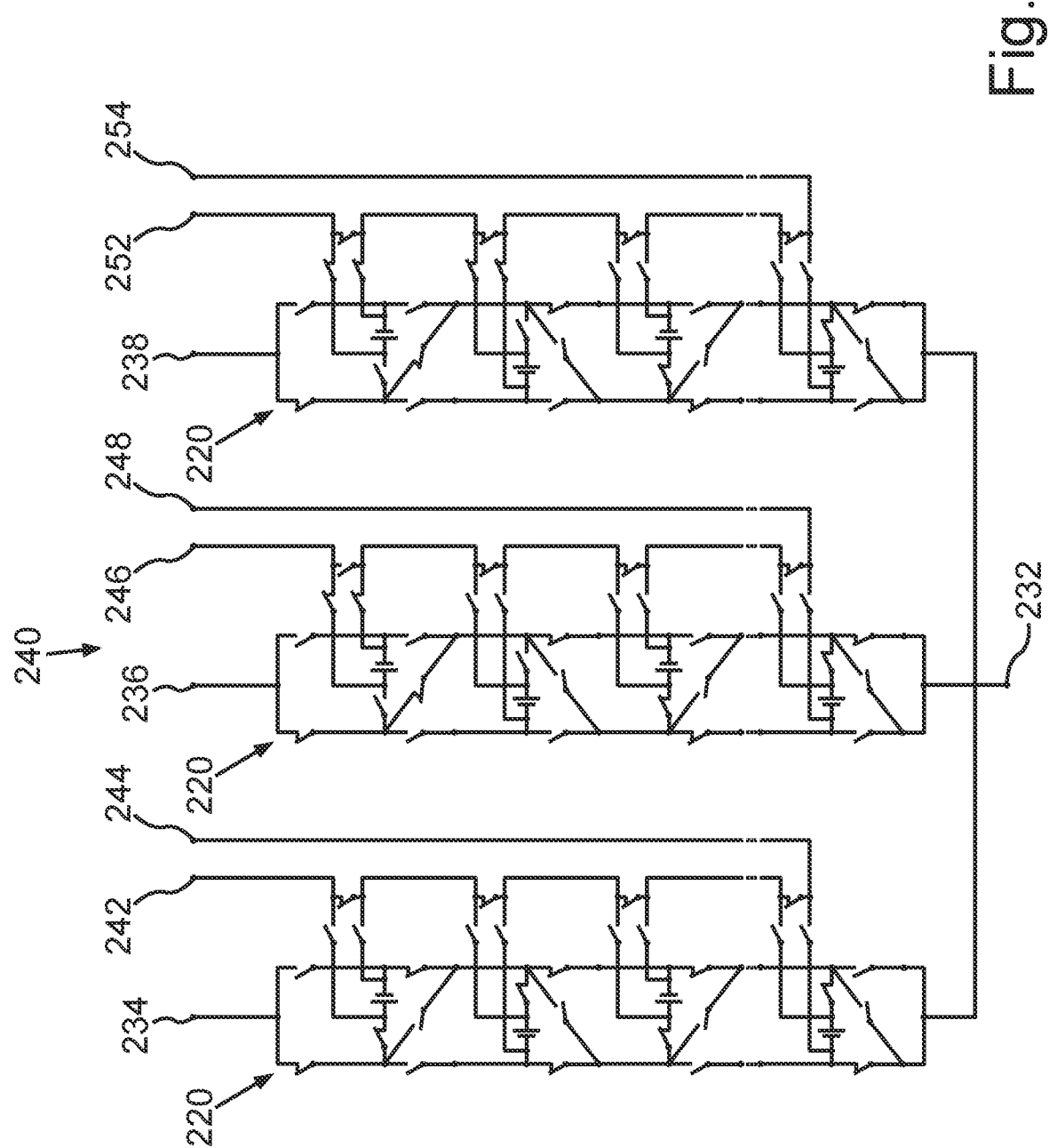
FIG. 13 a schematic circuit diagram of a battery with three battery modules according to FIG. 12 according to the first design.

In an additional schematic circuit diagram, FIG. 13 shows a first configuration for a battery 240 in which three modules 220 are provided. The modules 220 correspond to those previously explained in relation to FIG. 12, and therefore reference is made to these statements for additional information.

In the configuration of the battery 240 according to FIG. 13, the die module connections 224 are attached together to a terminal 232 of the battery 240. The opposite module connections 222 are connected to corresponding individual terminals 234, 236, 238 of the battery 240. In the present case the battery 240 is operated such that a three-phase alternating current is supplied between the corresponding terminals 232, 234, 236, 238. In this configuration the terminal 232 forms a zero potential. In alternative configurations, a delta connection can also be provided here.

The battery 240 includes further connection poles 242, 244, 246, 248, 252, 254. Thus, the embodiment according to FIG. 13 provides that the module connections 226, 228 of the battery module 220 shown on the far left in FIG. 13 be connected to connection poles 242, 244. The same applies to the middle battery module 220 in FIG. 13, whose module connections 226, 228 are connected to the corresponding connection poles 246, 248. Finally, the module connections 226, 228 of the battery module 220 shown on the right in FIG. 13 are connected to the corresponding connection poles 252, 254. This enables the battery 240 to provide six independent electrical voltages. For example, the battery 240 can be used as an energy converter to provide the three-phase alternating voltage between the connection poles 232, 234, 236, 238, for example. For this purpose, the first of the switching units 218 of the corresponding battery cells 200 of the battery modules 220 can be operated accordingly. The unused battery cells 200 of each of the battery modules 220 can then be deactivated with respect to the connection poles 232, 234, 236, 238, so that they can be used for further use to provide an electrical voltage at the connection poles 242, 244, 246, 248, 252, 254. Here, for example, the available battery cells 200 of each of the battery modules 220 can be used to provide a corresponding DC voltage. For this purpose, the second switching unit 216 of one of the respective battery cells 200 can be set to a switching state, such that the galvanic cell 12 of a respective battery cell 200 is activated to provide the electrical voltage at the corresponding connection poles 242, 244, 246, 248, 252, 254. In this way, in addition to a three-phase AC voltage, additional voltages, for example a DC voltage or a further AC voltage can be provided by means of battery 240. This is helpful, for example, if an on-board supply system of a motor vehicle is to be supplied with electrical energy or an excitation of an externally excited synchronous machine, such as the synchronous machine 72, is to be provided.

Figure 14:
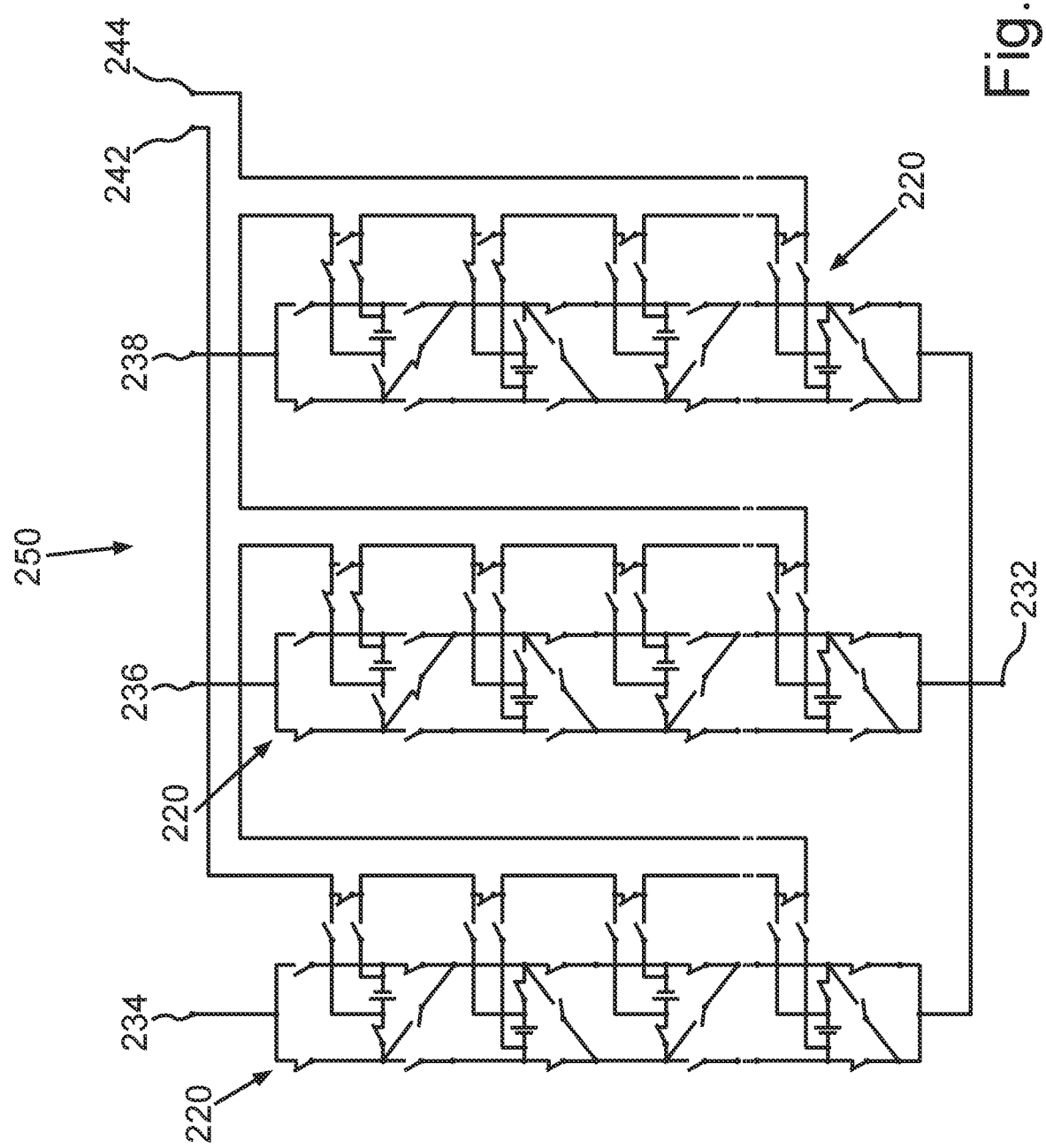
FIG. 14 a schematic circuit diagram of a battery with three battery modules according to FIG. 12 according to the second design.

FIG. 14 shows a schematic circuit diagram of a battery 250, whose circuit structure is substantially based on the circuit structure of battery 240, as explained in FIG. 13. Therefore, in the following, only the differences in the embodiment as shown in FIG. 13 will be discussed.

A difference between the embodiment according to FIG. 14 and the embodiment according to FIG. 13 is that the battery 250 has only two further connection poles 242, 244, in addition to the connection poles 232, 234, 236, 238. The module connections 226, 228 of the three battery modules 220 shown in FIG. 14 are connected in series, whereby the series connection formed by this is connected to the connection poles 242, 244. This circuit structure has the advantage that, in order to provide an electrical voltage at the connection poles 242, 244, a DC voltage can be provided for the AC voltage supply depending on the unused battery cells 200 of the respective battery modules 220, whereby, depending on the respective phase positions of the three-phase AC voltage to each another provided at the connection poles 232, 234, 236, 238, the respective battery cells 200 are variably activated or deactivated for the provision of the DC voltage at the connection poles 242, 244. This allows to provide a high DC voltage at the connection poles 242, 244 which is higher than the voltage which is possible with a single battery module 220 and simultaneous provision of an AC voltage. The fact that not all of the battery cells 200 of each of the battery modules 220 need to be activated for the momentary supply of a respective phase voltage of the three-phase alternating voltage is taken advantage of. In addition, the available battery cells 200 of each of the battery modules 220 change over time, whereby overall, however, a substantially constant number of battery cells 200 can be made available over all three phases, so that a DC voltage at the connection poles 242, 244 can be reliably achieved despite the currently varying loads on the battery modules 220. Of course, it is also possible to provide an alternating voltage at the connection poles 242, 244.

Figure 15:
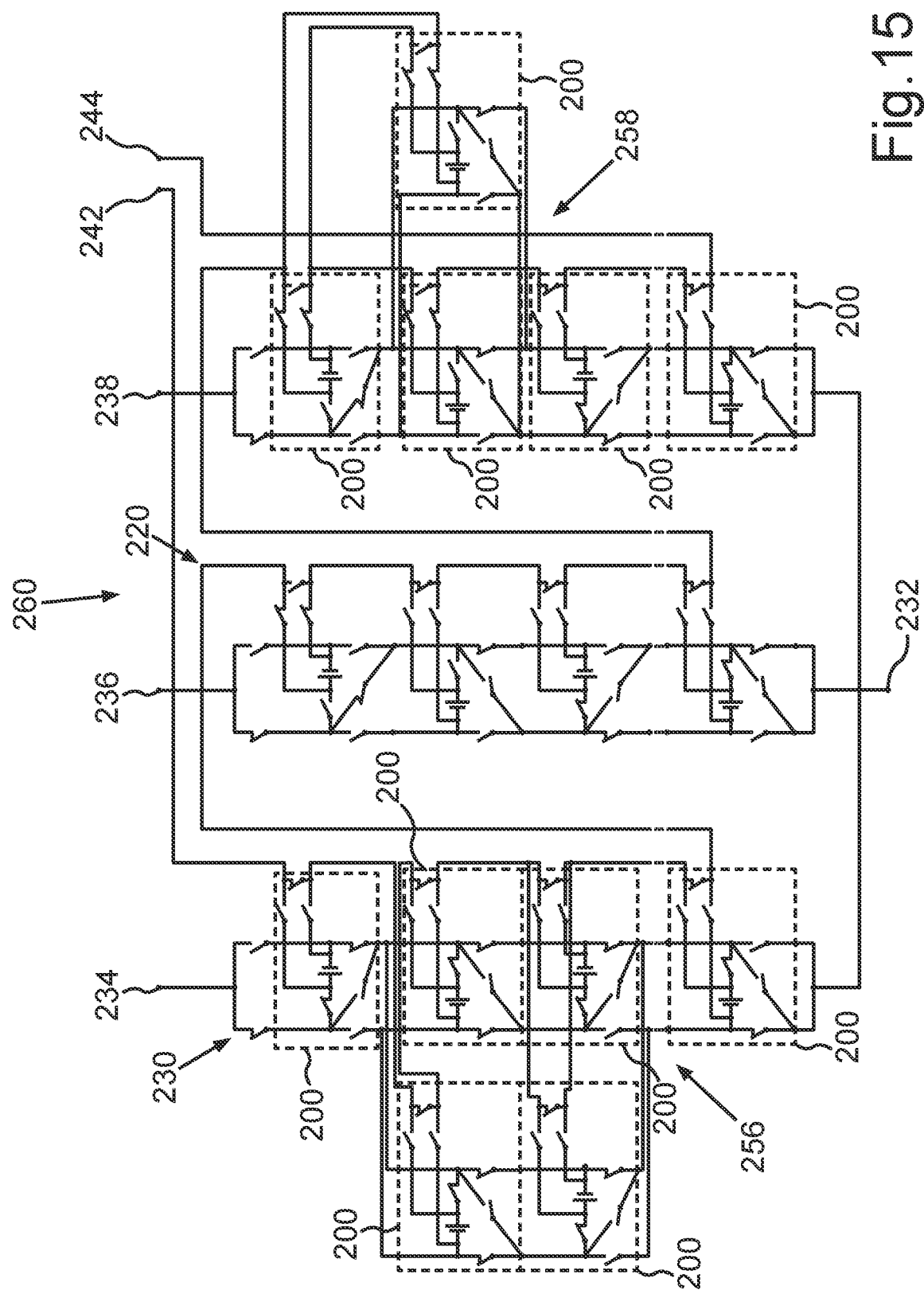
FIG. 15 a schematic circuit diagram of a battery with three battery modules according to FIG. 12 according to the third design.

In addition, the invention allows a number of further combination possibilities and circuit structures, as shown for example with battery 260 according to FIG. 15. The circuit structure of battery 260 is substantially based on the circuit structure of battery 250, as explained in FIG. 14, which is why reference is made to the relevant explanations.

Battery 260 differs from battery 250 as shown in FIG. 14 in that the left battery module 220 of battery 250 is replaced by a battery module 256 and the right battery module 220 of battery 250 is replaced by a battery module 258, as further explained below.

Battery module 258 differs from battery module 220 according to FIG. 12 in that another battery cell 200 is connected in parallel to one of the middle battery cells 200 of battery module 220. The parallel connection refers to all the corresponding cell connectors of the respective battery cells 200, thus enabling an increased current carrying capacity to be provided for certain voltage levels.

A further variant of a battery module is the battery module 256, which is also based on the embodiment of the battery module 220 according to FIG. 12. FIG. 15 shows that the battery module 256 has two more cascaded battery cells 200 compared to the battery module 220 according to FIG. 12, which are connected in parallel to two battery cells 200 according to the circuit structure in FIG. 12. The second cell connectors of an upper one of the two battery cells 200 are also connected in series with the existing series connection of the second cell connectors. For the lower one of the battery modules 200 it is provided that the second cell connectors are connected in parallel to the corresponding second cell connectors with respect to the correspondingly spatially assigned battery cells 200. With regard to the voltages to be provided at the second cell connectors, an additional capacity or current carrying capacity can be achieved.

Of course, almost any other combination of battery cells and battery modules can be provided to achieve combinations that are particularly suitable or adapted for specific applications. All in all, the invention thus allows the creation of a particularly flexible and highly dynamically adaptable battery that can be easily adapted to specific applications. The special design of the battery cells 200 makes this possible. The switching elements in this case are formed by semiconductor switching elements and are preferably connected to the control unit, which ensures a suitable switching operation of the switching elements.

The essential advantage of the presented patent idea is that battery cells, which were originally assigned to the generation of a single phase voltage, but are temporarily unused due to the current voltage value or similar, can be used for the generation of other phase voltages.

Consequently, the battery system is optimized in such a way that preferably at all times the "entire available battery potential" can be used.

This allows the freedom to create a flexible allocation of battery cells and/or battery modules or batteries to different, for example sinusoidal, phase voltages. This means that these contribute their current voltage value to the respectively assigned phase voltage.

Depending on the selected frequency values or optimization algorithms, the allocation can be varied at will over time, for example before and/or during operation. The allocation can be done for time reasons, but can also result from any other criterion. The allocation can be fixed or variable for each individual cell. The allocation can change between fixed and variable once or several times.

Compared to conventional multilevel energy converters, the number of effectively used battery cells or battery modules can be increased. The additional battery cells or battery modules can be used to increase the performance of the battery system or battery. For example, the output voltage of the multilevel energy converter can be increased. With the same current capability of the voltage source, the power can be increased proportionally to each newly added voltage source. On the other hand, if the power requirements remain the same, increasing the voltage level can result in a lower current load. This results, for example, in lower power losses and less aging of the battery cells or battery modules.

The proposed idea allows the design of output voltages with any number of phases m. The individual phase voltages can have any shape, such as sinus wave, triangle, sawtooth, etc., flexible phase shifts to each other, and their amplitudes ($V_{AC}$) can be individually adjusted as required.

It should be noted that the values of the actually used voltage/battery potential can change over time based on the respective phase shifts of the output voltages of the multilevel energy converter to be generated. This can be examined and considered depending on the application.

In the case of an equidistant phase shift between the individual phase voltages, which is usually present, especially in an electrical machine, the value of the actually used battery potential and thus also the value of the "unused" utilization potential is approximately constant.

The described idea also offers the freedom to generate output voltages with a positive and/or negative DC offset. For this purpose, only the number of battery cells or battery modules, which are flown through in such a way that they make a positive voltage contribution to the respective phase voltage, has to differ from the number of battery cells or battery modules, which make a negative voltage contribution to the respective phase voltage within a period.

The selection of the individual battery cells or battery modules for the respective phase voltages, the determination of currently unused battery cells or battery modules, an optimized "partitioning" of the battery system in this respect as well as maximum efficient control of the built-in power semiconductors is carried out with a control device that can use corresponding control algorithms.

It can be freely decided whether all or only a part of the newly accessible utilization potential is used. For example, only a part of the battery cells or battery modules can be used to ensure the symmetry of the multi-phase system in case of failure of battery cells or battery modules. In another case it is possible to create asymmetrical multi-phase systems, for example to better compensate the load by asymmetrical loads in case of failure.

Furthermore, it is possible to create multi-phase voltage systems with a smaller total number of single voltage sources. For example, the output voltage of a battery system or battery determines how many cells are connected in series in this battery system or battery. If a battery system is to be created with fewer battery cells or battery modules, it is not possible to create it without lowering the desired output voltage specification. With the solution proposed here it is possible to create battery systems or batteries with a smaller number of battery cells or battery modules while maintaining the same output voltage. This becomes possible by temporarily unused battery cells or battery modules of a particular phase being able to deliver their voltage contributions to one or more other phases, for example by allocating battery cells or battery modules to phases in a variable way.

Another advantage resulting from the proposed idea would be the reduction of the volume and weight of the battery system or battery. In case of the actual utilization of the entire utilization potential by allocating temporarily unused battery cells or battery modules to other phase voltages, a significant number of battery cells or battery modules can be saved, which in turn can reduce the installation space or required space of the battery.

It is also possible to use the newly developed potential of battery cells or battery modules to compensate for failed battery cells or battery modules. If a battery cell or a battery module from a string fails, it can be compensated by one or more temporarily battery cells or battery modules.

Furthermore, the following effects can be achieved with the invention:

The resource utilization of battery cells that are actually inactive at times can be realized, for example, through the modularity of battery cells. In contrast to prior art multi-level energy converters, the modularity of the topology according to the invention is not characterized by a mere series connection of battery modules, for example within a phase, but to a certain extent by a module matrix in which one battery module can be connected to more than two neighboring battery modules, for example z neighboring battery modules, where z corresponds to the number of circuit breakers via which the respective battery module can be electrically connected to other battery modules. Thus, z different current paths through one module are possible.

This functionality facilitates or enables the formation of positive and negative output voltage levels, i.e. it integrates the ability to reverse the polarity of the output voltages. It is also possible to equip individual battery modules in the battery with a different number of semiconductor switching elements outside the battery modules, for example $z_i$, where i corresponds to the i-th battery module, so that the number of module connections can vary. This is advantageous in that the number of neighboring battery modules of a battery module located inside a battery can differ from that of an edge battery module of the battery. This modularity does not have to be limited to one battery level, e.g. two-dimensional, but a three-dimensional structure of numerous battery modules is also conceivable.

The allocation of the battery modules to the individual phases as well as the generation of gate signals for the semiconductor switching elements between the individual battery modules can be generated using appropriate modulation/control methods. The generation of the switching signals for the semiconductor switching elements between the battery modules can be selected in such a way that in the ideal case the switching signals only change at low frequency and thus cause low switching losses. This can be seen, for example, in the allocation of battery module 12 in the previously shown FIGS. 1 to 3, since the classification of this battery module does not change over more than one time step and thus the switch positions of the semiconductor switching elements surrounding this battery module do not change.

In view of the existing advantage that individual battery modules can also be used to provide a constant DC voltage with the proposed topology, battery module 12 in FIG. 2 and FIG. 3, for example, can also be used for this purpose and permanently supply the required on-board voltage, which can be 48V, for example. As a result, the proposed switching idea/topology causes the combination of a DC/AC and a DC/DC converter and a DC-AC/DC inverter through battery 48.

As mentioned before, the module matrix does not have to be limited to one level, but can be extended to several levels.

Within the different battery modules, different switching topologies of the battery cells 46 can also be realized. A wide variety of topology variants can be implemented with p parallel-connected battery cells or battery strings and m serial-connected battery cells.

Around the battery module 10 there are four external semiconductor switching elements $S_{e1}$, $S_{e2}$, $S_{e3}$, $S_{e4}$ for combination/connection with other battery modules. The semiconductor switching elements $S_{b1}$, $S_{b2}$, $S_{b3}$, $S_{b4}$ within the battery module additionally allow the connection or disconnection of individual strings from each other as well as the possibility of conducting current from each of the external semiconductor switching elements $S_{e1}$, $S_{e2}$, $S_{e3}$, $S_{e4}$ through the battery module to any other of these four semiconductor switching elements.

Figure 16:
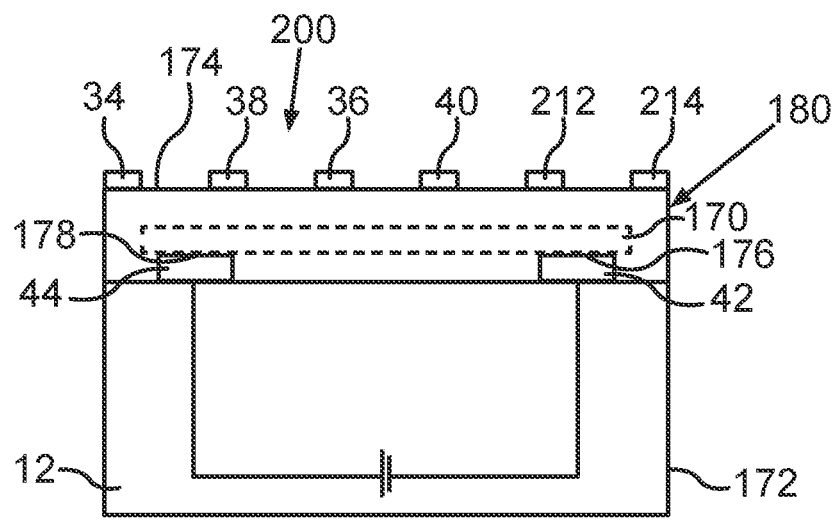
FIG. 16 a schematic side view of a battery cell according to FIG. 11 with a cell casing with a galvanic cell and a circuit board with semiconductor switch elements arranged in it in an integrated way, and FIG. 17 a schematic side view of a battery cell according to FIG. 16, where the galvanic cell is detachable from the cell casing.

FIG. 16 shows a schematic side view of the battery cell 200 according to FIG. 11 with a cell housing 180, in which the galvanic cell 12 and a printed circuit board 130 with the semiconductor switching elements 30, 32, 202, 204, 206, 208, 210 are integrated. The cell housing 180 comprises a housing cup 172, in the lower part of which the galvanic cell 12 is arranged. In FIG. 7, the printed circuit board 170 with the semiconductor switching elements 30, 32 is arranged above the galvanic cell 12 in the housing cup 172, whereby the semiconductor switching elements 30, 32, 202, 204, 206, 208, 210 are not shown in this figure. The housing cup 172 is closed by means of a housing cover 174, so that the printed circuit board 170 and the galvanic cell 12 are protected from external influences.

The printed circuit board 170 provides contact surfaces 176, 178 as connecting contacts for contacting the potential connections 42, 44 of the galvanic cell 12. Furthermore, the printed circuit board 170 provides further contact surfaces to which the cell connectors 34, 36, 38, 40, 212, 214 are connected. The cell connectors 34, 36, 38, 40, 212, 214 are located on the housing cover 174, so that the battery cell 200 can be electrically contacted in the intended way.

In the present case, it is provided that the potential connections 42, 44 of the galvanic cell 12 are pressed against the contact surfaces 176, 178 of the printed circuit board 170 by a spring force in order to establish the electrical contact. In alternative embodiments, another electrical connection can of course be provided here, for example by means of a screw or plug connection or the like. In this embodiment, the galvanic cell 12 is integrated with the circuit board 170 and arranged in the cell housing 180 of the battery cell 200.

Figure 17:
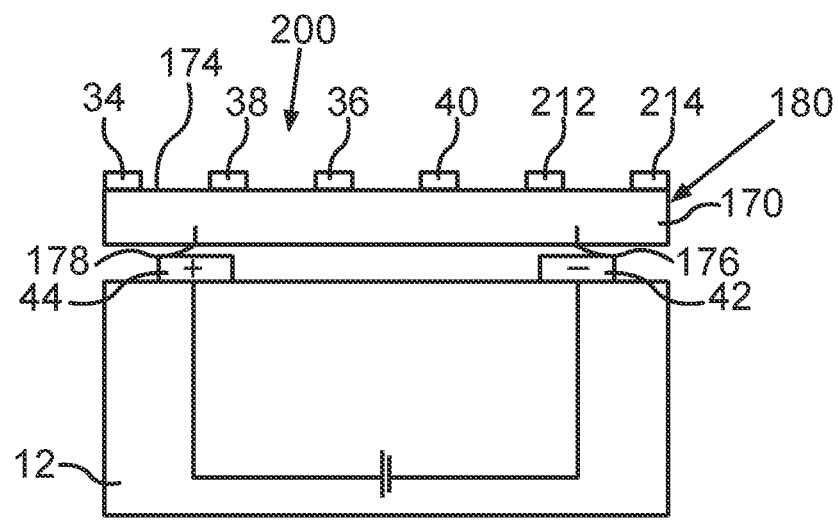

FIG. 17 shows a schematic side view of a battery cell like FIG. 16 in an alternative embodiment to FIG. 16, whereby the galvanic cell 12 is detachably mounted on the cell housing 180. The cell housing in this embodiment is formed by the printed circuit board 170 itself. The printed circuit board 170 provides not only the contact surfaces 176, 178 as connection contacts for contacting the potential connections 42, 44 of the galvanic cell 12, but also the cell connectors 34, 36, 38, 40, 212, 214. With this embodiment, the galvanic cell 12 can therefore be manufactured separately from the battery cell 200 and connected to the printed circuit board 170. This has the advantage that the production of the battery cell 200 and the galvanic cell 12 can be decoupled from each other.

In principle, it can naturally also be provided in an alternative embodiment that a cell housing is provided, which covers at least the printed circuit board 170 and provides the cell connectors 34, 36, 38, 40, 212, 214. Furthermore, in a further alternative embodiment, the cell housing can also provide the connection contacts for the galvanic cell 12 as well as fastening elements, so that the galvanic cell 12 can be connected to the cell housing. For this purpose, the connecting contacts can be designed as screw terminals, for example, by means of which the potential connections 42, 44 of galvanic cell 12 can be electrically contacted. At the same time, a mechanical connection can also be achieved in this way. In addition, a mechanical connection can also be provided in the form of a clip connection, a clamping yoke and/or the like. Of course, these embodiments can also be combined with each other in almost any combination.

The embodiments serve exclusively to explain the invention and are not intended to limit it.

The invention claimed is:

1. A battery cell comprising:
   four first cell connectors configured as main terminals;
   a galvanic cell; and
   a first switching unit electrically coupled to the first cell connectors, wherein the galvanic cell is configured to be electrically coupled to the first cell connectors depending on a switching state of the first switching unit;
   two second cell connectors configured as secondary terminals that are electrically isolated from the four first cell connectors, wherein the second cell connectors are connected to two center taps of the first switching unit; and
   a second switching unit that is configured to be electrically coupled to the second cell connectors to electrically couple the galvanic cell to the second cell connectors depending on a switching state of the second switching unit.

2. The battery cell of claim 1, wherein the first switching unit and/or the second switching unit comprise at least one bridging switching element.

3. The battery cell according to claim 1, wherein the first switching unit is configured to electrically couple at least two of the first cell connectors to each other depending on one of several switching states of the first switching unit, and/or the second switching unit is configured to electrically couple at least two of the second cell connectors to each other.

4. The battery cell according to claim 1, wherein the first switching unit further comprises:
   a first switching element configured to electrically couple the second main terminal and the third main terminal,
   a second switching element configured to electrically couple the first main terminal and the fourth main terminal,
   a third switching element configured to electrically couple the first main terminal and the second main terminal, and
   a fourth switching element connected in series with the galvanic cell, wherein the first series circuit is connected between the second main terminal and the fourth main terminal such that a first potential terminal of the galvanic cell is connected to the fourth main terminal, and the second switching unit comprises a series circuit of three switching elements, the second switching element of the series circuit being directly connected to both potential terminals of the galvanic cell.

5. The battery cell according to claim 1, further comprising:
   a cell housing in which at least the first switching element and the second switching element are arranged which has at least one terminal contact for each of the cell connectors and each of the terminal contacts is configured to be electrically isolated from other terminal contacts.

6. The battery module comprising a first battery cell and a second battery cell formed according to the battery cell of claim 1, wherein pairs of first cell connectors of the first battery cell are electrically connected to pairs the first cell connectors of the second battery cell.

7. The battery module according to claim 6, wherein a second cell connector of the first battery cell is configured to be electrically connected to a second cell connector of the second battery cell.

8. The battery module according to claim 6, wherein the battery module is configured to be connected to at least six connection poles.

9. A motor vehicle with an on-board supply system comprising an electric machine as a drive device with the battery of claim 8 and the electric machine is directly connected to the battery.

10. The battery cell of claim 1, wherein the first switching unit and/or the second switching unit further comprise:
   at least one bridging switching element.

11. The battery cell according to claim 1, wherein the first switching unit further comprises:
   a first switching element configured to electrically couple the second main terminal and the third main terminal,
   a second switching element configured to electrically couple the first main terminal and the fourth main terminal,
   a third switching element configured to electrically couple the first main terminal and the second main terminal, and
   a fourth switching element connected in series with the galvanic cell, wherein the first series circuit is connected between the second main terminal and the fourth main terminal such that a first potential terminal of the galvanic cell is configured to be connected to the fourth main terminal, and the second switching unit comprises a series circuit of three switching elements, the second switching element of the series circuit being directly connected to both potential terminals of the galvanic cell.

12. The battery cell according to claim 2, wherein the first switching unit further comprises:
   a first switching element configured to electrically couple the second main terminal and the third main terminal,
   a second switching element configured to electrically couple the first main terminal and the fourth main terminal,
   a third switching element configured to electrically couple the first main terminal and the second main terminal, and
   a fourth switching element connected in series with the galvanic cell, wherein the first series circuit is connected between the second main terminal and the fourth main terminal such that a first potential terminal of the galvanic cell is configured to be connected to the fourth main terminal, and the second switching unit comprises a series circuit of three switching elements, the second switching element of the series circuit being directly connected to both potential terminals of the galvanic cell.

13. The battery cell according to claim 3, wherein the first switching unit further comprises:
   a first switching element configured to electrically couple the second main terminal and the third main terminal,
   a second switching element configured to electrically couple the first main terminal and the fourth main terminal,
   a third switching element configured to electrically couple the first main terminal and the second main terminal, and
   a fourth switching element connected in series with the galvanic cell, wherein the first series circuit is connected between the second main terminal and the fourth main terminal such that a first potential terminal of the galvanic cell is configured to be connected to the fourth main terminal, and the second switching unit comprises a series circuit of three switching elements, the second switching element of the series circuit being directly connected to both potential terminals of the galvanic cell.

14. The battery cell according to claim 1, further comprising:
   a cell housing in which the first switching element and the second switching element are arranged which has at least one terminal contact for each of the cell connectors and each of the terminal contacts is configured to be electrically isolated from other terminal contacts.

15. The battery cell according to claim 2, further comprising:
   a cell housing in which the first switching element and the second switching element are arranged which has at least one terminal contact for each of the cell connectors and each of the terminal contacts is configured to be electrically isolated from other terminal contacts.

* * * * *